US012253898B2

(12) United States Patent
McNamara et al.

(10) Patent No.: US 12,253,898 B2
(45) Date of Patent: *Mar. 18, 2025

(54) METHODS AND SYSTEMS FOR DISTRIBUTED POWER CONTROL OF FLEXIBLE DATACENTERS

(71) Applicant: LANCIUM LLC, Houston, TX (US)

(72) Inventors: Michael T. McNamara, Newport Beach, CA (US); David J. Henson, Houston, TX (US); Raymond E. Cline, Jr., Houston, TX (US)

(73) Assignee: LANCIUM LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,134

(22) Filed: Apr. 25, 2023

(65) Prior Publication Data
US 2023/0259192 A1 Aug. 17, 2023

Related U.S. Application Data

(63) Continuation of application No. 17/692,636, filed on Mar. 11, 2022, now Pat. No. 11,669,144, which is a (Continued)

(51) Int. Cl.
*G06F 1/00* (2006.01)
*G06F 1/3234* (2019.01)
(Continued)

(52) U.S. Cl.
CPC ............ *G06F 1/3234* (2013.01); *G06F 1/324* (2013.01); *G06F 1/3287* (2013.01); *G06F 1/329* (2013.01); *G06F 1/3296* (2013.01)

(58) Field of Classification Search
CPC ...... G06F 1/3234; G06F 1/324; G06F 1/3287; G06F 1/329; G06F 1/3296; G06F 1/20;
(Continued)

(56) References Cited

U.S. PATENT DOCUMENTS 4,106,097 A  8/1978  Fox et al.
4,245,319 A  1/1981  Hedges
(Continued)

FOREIGN PATENT DOCUMENTS

CN   1806374 A    7/2006
CN   101799681 A  8/2010
(Continued)

OTHER PUBLICATIONS

Abhyankar et al., "Using PETSc to Develop Scalable Applications for Next-Generation Power Grid," High Performance Computing, Networking and Analytics for the Power Grid, Nov. 2011 pp. 67-74 https://doi.org/10.1145/2096123.2096138.
(Continued)

*Primary Examiner* — Nitin C Patel
(74) *Attorney, Agent, or Firm* — Barnes & Thornburg LLP

(57) ABSTRACT

A distributed power control system is provided that can include a datacenter and a remote master control system. The datacenter can include (i) computing systems, (ii) a behind-the-meter power input system configured to receive power from a behind-the-meter power source and deliver power to the computing systems, and (iii) a datacenter control system configured to control the computing systems and the behind-the-meter power input system. The remote master control system can be configured to issue instructions to the datacenter that affect an amount of behind-the-meter power consumed by the datacenter. The datacenter control system can receive, from a local station control system configured to at least partially control the behind-the-meter power source, a directive for the datacenter to ramp-down power consumption, and in response to receiving the directive, cause the computing systems to perform a set of predetermined operations correlated with the directive.

20 Claims, 13 Drawing Sheets

Related U.S. Application Data continuation of application No. 17/328,275, filed on May 24, 2021, now Pat. No. 11,275,427, which is a continuation of application No. 16/132,092, filed on Sep. 14, 2018, now Pat. No. 11,016,553.

(51) Int. Cl.
  *G06F 1/324* (2019.01)
  *G06F 1/3287* (2019.01)
  *G06F 1/329* (2019.01)
  *G06F 1/3296* (2019.01)

(58) Field of Classification Search
  CPC ......... G06F 1/26; G06F 1/3203; Y02B 10/70; Y02D 10/00; Y02E 10/50; Y02P 90/50; H02J 9/06; H02J 7/35
  See application file for complete search history.

(56) References Cited

U.S. PATENT DOCUMENTS

| | | |
|---|---|---|
| 4,247,786 A | 1/1981 | Hedges |
| 4,371,779 A | 2/1983 | Maynard et al. |
| 4,551,812 A | 11/1985 | Gurr et al. |
| 5,142,672 A | 8/1992 | Johnson et al. |
| 5,367,669 A | 11/1994 | Holland et al. |
| 5,544,046 A | 8/1996 | Niwa |
| 5,761,083 A | 6/1998 | Brown, Jr. et al. |
| 5,913,046 A | 6/1999 | Barth et al. |
| 6,115,698 A | 9/2000 | Tuck et al. |
| 6,244,516 B1 | 6/2001 | Langervik et al. |
| 6,288,456 B1 | 9/2001 | Cratty |
| 6,437,692 B1 | 8/2002 | Petite et al. |
| 6,473,744 B1 | 10/2002 | Tuck et al. |
| 6,519,509 B1 | 2/2003 | Nierlich et al. |
| 6,618,709 B1 | 9/2003 | Sneeringer |
| 6,633,823 B2 | 10/2003 | Bartone et al. |
| 6,643,567 B2 | 11/2003 | Kolk et al. |
| 6,681,154 B2 | 1/2004 | Nierlich et al. |
| 6,745,105 B1 | 6/2004 | Fairlie et al. |
| 6,748,932 B1 | 6/2004 | Sorter et al. |
| 6,772,031 B1 | 8/2004 | Strand |
| 6,775,595 B1 | 8/2004 | Yabutani et al. |
| 6,785,592 B1 | 8/2004 | Smith et al. |
| 6,868,293 B1 | 3/2005 | Schurr et al. |
| 6,912,450 B2 | 6/2005 | Fairlie et al. |
| 7,010,363 B2 | 3/2006 | Donnelly et al. |
| 7,027,992 B2 | 4/2006 | Zaccaria et al. |
| 7,035,179 B2 | 4/2006 | Chen et al. |
| 7,053,767 B2 | 5/2006 | Petite et al. |
| 7,054,271 B2 | 5/2006 | Brownrigg et al. |
| 7,062,360 B2 | 6/2006 | Fairlie et al. |
| 7,076,339 B2 | 7/2006 | Yabutani et al. |
| 7,088,014 B2 | 8/2006 | Nierlich et al. |
| 7,127,328 B2 | 10/2006 | Ransom |
| 7,130,832 B2 | 10/2006 | Bannai et al. |
| 7,135,956 B2 | 11/2006 | Bartone et al. |
| 7,143,300 B2 | 11/2006 | Potter et al. |
| 7,149,605 B2 | 12/2006 | Chassin et al. |
| 7,181,316 B2 | 2/2007 | Fairlie et al. |
| 7,188,003 B2 | 3/2007 | Ransom et al. |
| 7,206,670 B2 | 4/2007 | Pimputkar et al. |
| 7,278,273 B1 | 10/2007 | Whitted et al. |
| 7,305,282 B2 | 12/2007 | Chen |
| 7,333,880 B2 | 2/2008 | Brewster et al. |
| 7,369,968 B2 | 5/2008 | Johnson et al. |
| 7,376,851 B2 | 5/2008 | Kim |
| 7,420,293 B2 | 9/2008 | Donnelly et al. |
| 7,460,930 B1 | 12/2008 | Howell et al. |
| 7,468,661 B2 | 12/2008 | Petite et al. |
| 7,519,453 B2 | 4/2009 | Fairlie et al. |
| 7,561,977 B2 | 7/2009 | Horst et al. |
| 7,565,224 B2 | 7/2009 | Fairlie et al. |
| 7,647,516 B2 | 1/2010 | Ranganathan et al. |
| 7,702,931 B2 | 4/2010 | Goodrum et al. |
| 7,779,276 B2 | 8/2010 | Bolan et al. |
| 7,783,907 B2 | 8/2010 | Dubinsky |
| 7,861,102 B1 | 12/2010 | Ranganathan et al. |
| 7,921,315 B2 | 4/2011 | Langgood et al. |
| 7,970,561 B2 | 6/2011 | Pfeiffer |
| 8,001,403 B2 | 8/2011 | Hamilton et al. |
| 8,006,108 B2 | 8/2011 | Brey et al. |
| 8,080,900 B2 | 12/2011 | Corhodzic et al. |
| 8,214,843 B2 | 7/2012 | Boss et al. |
| 8,260,913 B2 | 9/2012 | Knapp et al. |
| 8,327,123 B2 | 12/2012 | Juffa et al. |
| 8,374,928 B2 | 2/2013 | Gopisetty et al. |
| 8,447,993 B2 | 5/2013 | Greene et al. |
| 8,571,820 B2 | 10/2013 | Pfeiffer |
| 8,595,094 B1 | 11/2013 | Forbes, Jr. |
| 8,595,515 B1 | 11/2013 | Weber et al. |
| 8,601,287 B1 | 12/2013 | Weber et al. |
| 8,627,123 B2 | 1/2014 | Jain et al. |
| 8,639,392 B2 | 1/2014 | Chassin |
| 8,700,929 B1 | 4/2014 | Weber et al. |
| 8,706,914 B2 | 4/2014 | Duchesneau |
| 8,706,915 B2 | 4/2014 | Duchesneau |
| 8,719,223 B2 | 5/2014 | Knapp et al. |
| 8,789,061 B2 | 7/2014 | Pavel et al. |
| 8,799,690 B2 | 8/2014 | Dawson et al. |
| 8,839,551 B2 | 9/2014 | Swann |
| 8,849,469 B2 | 9/2014 | Belady et al. |
| 9,003,211 B2 | 4/2015 | Pfeiffer |
| 9,003,216 B2 | 4/2015 | Sankar et al. |
| 9,026,814 B2 | 5/2015 | Aasheim et al. |
| 9,027,024 B2 | 5/2015 | Mick et al. |
| 9,143,392 B2 | 9/2015 | Duchesneau |
| 9,207,993 B2 | 12/2015 | Jain |
| 9,218,035 B2 | 12/2015 | Li et al. |
| 9,252,598 B2 | 2/2016 | Belady et al. |
| 9,282,022 B2 | 3/2016 | Matthews et al. |
| 9,416,904 B2 | 8/2016 | Belady et al. |
| 9,477,279 B1 | 10/2016 | Piszczek et al. |
| 9,542,231 B2 | 1/2017 | Khan et al. |
| 9,552,234 B2 | 1/2017 | Boldyrev et al. |
| 9,557,792 B1 | 1/2017 | Potlapally et al. |
| 9,618,991 B1 | 4/2017 | Clidaras et al. |
| 9,645,596 B1 | 5/2017 | Lee et al. |
| 9,800,052 B2 | 10/2017 | Li et al. |
| 9,890,905 B2 | 2/2018 | Plummer et al. |
| 9,915,927 B2 | 3/2018 | Kobayashi |
| 9,946,815 B1 | 4/2018 | Weber et al. |
| 9,994,118 B2 | 6/2018 | Williams et al. |
| 10,033,210 B2 | 7/2018 | Peterson et al. |
| 10,250,039 B2 | 4/2019 | Wenzel et al. |
| 10,334,758 B1 | 6/2019 | Ramirez et al. |
| 10,340,696 B2 | 7/2019 | Paine et al. |
| 10,360,077 B2 | 7/2019 | Mahindru et al. |
| 10,367,335 B2 | 7/2019 | Kawashima et al. |
| 10,367,353 B1 | 7/2019 | McNamara et al. |
| 10,367,535 B2 | 7/2019 | Corse et al. |
| 10,444,818 B1 | 10/2019 | McNamara et al. |
| 10,452,127 B1 | 10/2019 | McNamara et al. |
| 10,452,532 B2 | 10/2019 | McVay et al. |
| 10,497,072 B2 | 12/2019 | Hooshmand et al. |
| 10,545,560 B2 | 1/2020 | Mahindru et al. |
| 10,608,433 B1 | 3/2020 | McNamara et al. |
| 10,618,427 B1 | 4/2020 | McNamara et al. |
| 10,637,353 B2 | 4/2020 | Ohyama et al. |
| 10,709,076 B2 | 7/2020 | Pham |
| 10,795,428 B2 | 10/2020 | Walsh |
| 10,819,599 B2 | 10/2020 | Mahindru et al. |
| 10,822,992 B2 | 11/2020 | Spears |
| 10,838,482 B2 | 11/2020 | Mahindru et al. |
| 10,857,899 B1 | 12/2020 | McNamara et al. |
| 10,862,307 B2 | 12/2020 | Cavness et al. |
| 10,862,309 B2 | 12/2020 | Cavness et al. |
| 10,873,211 B2 | 12/2020 | McNamara et al. |
| 10,931,117 B2 | 2/2021 | Shoemaker |
| 11,009,909 B2 | 5/2021 | Kuwabara et al. |
| 11,016,456 B2 | 5/2021 | Henson et al. |
| 11,016,458 B2 | 5/2021 | McNamara et al. |
| 11,016,553 B2 | 5/2021 | McNamara et al. |
| 11,025,060 B2 | 6/2021 | McNamara et al. |

(56) References Cited

U.S. PATENT DOCUMENTS

| | | |
|---|---|---|
| 11,031,787 B2 | 6/2021 | McNamara et al. |
| 11,031,813 B2 | 6/2021 | McNamara et al. |
| 11,042,948 B1 | 6/2021 | McNamara et al. |
| 11,128,165 B2 | 9/2021 | McNamara et al. |
| 11,163,280 B2 | 11/2021 | Henson et al. |
| 11,169,592 B2 | 11/2021 | Mahindru et al. |
| 11,194,150 B2 | 12/2021 | Baba |
| 11,256,320 B2 | 2/2022 | McNamara et al. |
| 11,275,427 B2 | 3/2022 | McNamara et al. |
| 11,283,261 B2 | 3/2022 | McNamara et al. |
| 11,342,746 B2 | 5/2022 | McNamara et al. |
| 11,397,999 B2 | 7/2022 | McNamara et al. |
| 11,418,037 B2 | 8/2022 | Cavness et al. |
| 11,431,195 B2 | 8/2022 | McNamara et al. |
| 11,451,059 B2 | 9/2022 | Cavness et al. |
| 11,537,183 B2 | 12/2022 | Lewis et al. |
| 11,669,144 B2 | 6/2023 | McNamara et al. |
| 11,669,920 B2 | 6/2023 | McNamara et al. |
| 11,682,902 B2 | 6/2023 | McNamara et al. |
| 12,021,385 B2 | 6/2024 | Mcnamara et al. |
| 2002/0158749 A1 | 10/2002 | Ikeda et al. |
| 2002/0196124 A1 | 12/2002 | Howard et al. |
| 2003/0037150 A1 | 2/2003 | Nakagawa |
| 2003/0074464 A1 | 4/2003 | Bohrer et al. |
| 2003/0171851 A1 | 9/2003 | Brickfield et al. |
| 2004/0027004 A1 | 2/2004 | Bayoumi et al. |
| 2004/0117330 A1 | 6/2004 | Ehlers et al. |
| 2005/0005528 A1 | 1/2005 | Brault et al. |
| 2005/0034128 A1 | 2/2005 | Nagashima et al. |
| 2005/0102539 A1 | 5/2005 | Hepner et al. |
| 2005/0154499 A1 | 7/2005 | Aldridge et al. |
| 2005/0165512 A1 | 7/2005 | Peljto |
| 2005/0203761 A1 | 9/2005 | Barr et al. |
| 2006/0031180 A1 | 2/2006 | Tamarkin et al. |
| 2006/0059772 A1 | 3/2006 | Brault et al. |
| 2006/0161765 A1 | 7/2006 | Cromer et al. |
| 2006/0253675 A1 | 11/2006 | Johannes Bloks |
| 2007/0228837 A1 | 10/2007 | Nielsen et al. |
| 2008/0000151 A1 | 1/2008 | Houweling et al. |
| 2008/0013596 A1 | 1/2008 | Dunne et al. |
| 2008/0030078 A1 | 2/2008 | Whitted et al. |
| 2008/0082844 A1 | 4/2008 | Ghiasi et al. |
| 2008/0094797 A1 | 4/2008 | Coglitore et al. |
| 2008/0238195 A1 | 10/2008 | Shaver et al. |
| 2009/0012523 A1 | 1/2009 | Ruuttu et al. |
| 2009/0055665 A1 | 2/2009 | Maglione et al. |
| 2009/0070611 A1 | 3/2009 | Bower, III et al. |
| 2009/0078401 A1 | 3/2009 | Cichanowicz |
| 2009/0089595 A1 | 4/2009 | Brey et al. |
| 2009/0144566 A1 | 6/2009 | Bletsch et al. |
| 2009/0254660 A1 | 10/2009 | Hanson et al. |
| 2010/0088261 A1 | 4/2010 | Montalvo |
| 2010/0145542 A1 | 6/2010 | Chapel et al. |
| 2010/0211810 A1 | 8/2010 | Zacho |
| 2010/0235004 A1 | 9/2010 | Thind |
| 2010/0280675 A1 | 11/2010 | Tate, Jr. et al. |
| 2010/0313203 A1 | 12/2010 | Dawson et al. |
| 2010/0328849 A1 | 12/2010 | Ewing et al. |
| 2010/0333113 A1 | 12/2010 | Johnson et al. |
| 2011/0072289 A1 | 3/2011 | Kato |
| 2011/0115223 A1 | 5/2011 | Stahlkopf et al. |
| 2011/0208370 A1 | 8/2011 | Lee |
| 2011/0239015 A1 | 9/2011 | Boyd et al. |
| 2011/0282527 A1 | 11/2011 | Inbarajan et al. |
| 2011/0316337 A1 | 12/2011 | Pelio et al. |
| 2012/0032665 A1 | 2/2012 | Shaver, II et al. |
| 2012/0072745 A1 | 3/2012 | Ahluwalia et al. |
| 2012/0078430 A1 | 3/2012 | Fan et al. |
| 2012/0109705 A1 | 5/2012 | Belady et al. |
| 2012/0150679 A1 | 6/2012 | Lazaris |
| 2012/0290865 A1 | 11/2012 | Kansal et al. |
| 2012/0300524 A1 | 11/2012 | Fornage et al. |
| 2012/0306271 A1 | 12/2012 | Kuriyama |
| 2012/0321309 A1 | 12/2012 | Barry et al. |
| 2012/0324245 A1 | 12/2012 | Sinha et al. |
| 2012/0326511 A1 | 12/2012 | Johnson |
| 2013/0006401 A1 | 1/2013 | Shan |
| 2013/0007515 A1 | 1/2013 | Shaw et al. |
| 2013/0054987 A1 | 2/2013 | Pfeiffer et al. |
| 2013/0063991 A1 | 3/2013 | Xiao et al. |
| 2013/0111494 A1 | 5/2013 | Hyser et al. |
| 2013/0117621 A1 | 5/2013 | Saraiya et al. |
| 2013/0187464 A1 | 7/2013 | Smith et al. |
| 2013/0213038 A1 | 8/2013 | Lazaris |
| 2013/0218356 A1 | 8/2013 | Lee et al. |
| 2013/0227139 A1 | 8/2013 | Suffling |
| 2013/0328395 A1 | 12/2013 | Krizman et al. |
| 2014/0020292 A1 | 1/2014 | Mcnamara et al. |
| 2014/0070756 A1 | 3/2014 | Kearns et al. |
| 2014/0075222 A1 | 3/2014 | Jackson |
| 2014/0088781 A1 | 3/2014 | Kearns et al. |
| 2014/0114829 A1 | 4/2014 | Forbes, Jr. |
| 2014/0137468 A1 | 5/2014 | Ching |
| 2014/0149761 A1 | 5/2014 | Allen-Ware et al. |
| 2014/0150336 A1 | 6/2014 | Houweling |
| 2014/0180886 A1 | 6/2014 | Forbes, Jr. |
| 2014/0222225 A1 | 8/2014 | Rouse et al. |
| 2014/0365402 A1 | 12/2014 | Belady et al. |
| 2014/0365795 A1 | 12/2014 | Nielsen et al. |
| 2014/0379156 A1 | 12/2014 | Kamel et al. |
| 2015/0006940 A1 | 1/2015 | Kim et al. |
| 2015/0012113 A1 | 1/2015 | Celebi |
| 2015/0058845 A1 | 2/2015 | Song et al. |
| 2015/0106811 A1 | 4/2015 | Holler et al. |
| 2015/0121113 A1 | 4/2015 | Ramamurthy et al. |
| 2015/0155712 A1 | 6/2015 | Mondal |
| 2015/0212122 A1 | 7/2015 | Sobotka et al. |
| 2015/0229227 A1 | 8/2015 | Aeloiza et al. |
| 2015/0277410 A1 | 10/2015 | Gupta et al. |
| 2015/0278968 A1 | 10/2015 | Steven et al. |
| 2015/0278969 A1 | 10/2015 | Benoy et al. |
| 2015/0280492 A1 | 10/2015 | Narita |
| 2015/0288183 A1 | 10/2015 | Villanueva, Jr. et al. |
| 2015/0363132 A1 | 12/2015 | Uehara |
| 2015/0371328 A1 | 12/2015 | Gabel et al. |
| 2015/0372538 A1 | 12/2015 | Siegler et al. |
| 2016/0006066 A1 | 1/2016 | Robertson |
| 2016/0011617 A1 | 1/2016 | Liu et al. |
| 2016/0043552 A1 | 2/2016 | Villanueva, Jr. et al. |
| 2016/0054774 A1 | 2/2016 | Song et al. |
| 2016/0087909 A1 | 3/2016 | Chatterjee et al. |
| 2016/0091948 A1 | 3/2016 | Mitchell et al. |
| 2016/0109916 A1 | 4/2016 | Li et al. |
| 2016/0126783 A1 | 5/2016 | Cheng et al. |
| 2016/0170469 A1 | 6/2016 | Sehgal et al. |
| 2016/0172900 A1 | 6/2016 | Welch, Jr. |
| 2016/0187906 A1 | 6/2016 | Bodas et al. |
| 2016/0198656 A1 | 7/2016 | Mcnamara et al. |
| 2016/0202744 A1 | 7/2016 | Castro-Leon |
| 2016/0212954 A1 | 7/2016 | Argento |
| 2016/0248631 A1 | 8/2016 | Duchesneau |
| 2016/0261226 A1 | 9/2016 | Hamilton et al. |
| 2016/0324077 A1 | 11/2016 | Frantzen et al. |
| 2016/0329708 A1 | 11/2016 | Day |
| 2016/0377306 A1 | 12/2016 | Drees et al. |
| 2017/0023969 A1 | 1/2017 | Shows et al. |
| 2017/0104336 A1 | 4/2017 | Elbsat et al. |
| 2017/0104337 A1 | 4/2017 | Drees |
| 2017/0104342 A1 | 4/2017 | Eibsat et al. |
| 2017/0104343 A1 | 4/2017 | Eibsat et al. |
| 2017/0185132 A1 | 6/2017 | Bodas et al. |
| 2017/0192483 A1 | 7/2017 | Boss et al. |
| 2017/0194791 A1 | 7/2017 | Budde |
| 2017/0201098 A1 | 7/2017 | Carpenter |
| 2017/0214070 A1 | 7/2017 | Wang et al. |
| 2017/0237261 A1 | 8/2017 | Maug et al. |
| 2017/0261949 A1 | 9/2017 | Hoffmann et al. |
| 2017/0300359 A1 | 10/2017 | Kollur |
| 2017/0366412 A1 | 12/2017 | Piga |
| 2017/0373500 A1 | 12/2017 | Shafi et al. |
| 2018/0026478 A1 | 1/2018 | Peloso |
| 2018/0052431 A1 | 2/2018 | Shaikh et al. |
| 2018/0060106 A1 | 3/2018 | Madtha et al. |
| 2018/0101220 A1 | 4/2018 | Mahindru et al. |

(56) References Cited

U.S. PATENT DOCUMENTS

| | | |
|---|---|---|
| 2018/0105051 A1 | 4/2018 | Zheng et al. |
| 2018/0116070 A1 | 4/2018 | Broadbent et al. |
| 2018/0144414 A1 | 5/2018 | Lee et al. |
| 2018/0166881 A1 | 6/2018 | Suryanarayana et al. |
| 2018/0175666 A1 | 6/2018 | Ayer et al. |
| 2018/0202825 A1 | 7/2018 | You et al. |
| 2018/0240112 A1 | 8/2018 | Castinado et al. |
| 2018/0267839 A1 | 9/2018 | Maisuria et al. |
| 2018/0294649 A1 | 10/2018 | Bright et al. |
| 2018/0356770 A1 | 12/2018 | Eibsat et al. |
| 2018/0366978 A1 | 12/2018 | Matan et al. |
| 2018/0367320 A1 | 12/2018 | Montalvo |
| 2019/0005576 A1 | 1/2019 | Mick et al. |
| 2019/0052094 A1 | 2/2019 | Pmsvvsv et al. |
| 2019/0082618 A1 | 3/2019 | Lopez |
| 2019/0168630 A1 | 6/2019 | Mrlik et al. |
| 2019/0173283 A1 | 6/2019 | Epel et al. |
| 2019/0258307 A1 | 8/2019 | Shaikh et al. |
| 2019/0267806 A1 | 8/2019 | Scott et al. |
| 2019/0280521 A1 | 9/2019 | Lundstrom et al. |
| 2019/0318327 A1 | 10/2019 | Sowell et al. |
| 2019/0324820 A1 | 10/2019 | Krishnan et al. |
| 2019/0339756 A1 | 11/2019 | Lewis et al. |
| 2020/0019230 A1 | 1/2020 | Rong et al. |
| 2020/0051184 A1 | 2/2020 | Barbour |
| 2020/0167197 A1 | 5/2020 | Bahramshahry et al. |
| 2020/0177100 A1 | 6/2020 | Wang et al. |
| 2020/0318843 A1 | 10/2020 | Wenzel et al. |
| 2020/0321776 A1 | 10/2020 | Shaver, II et al. |
| 2021/0021135 A1 | 1/2021 | Eibsat et al. |
| 2021/0036547 A1 | 2/2021 | McNamara et al. |
| 2021/0101499 A1 | 4/2021 | Mcnamara et al. |
| 2021/0126456 A1 | 4/2021 | McNamara et al. |
| 2021/0175710 A1 | 6/2021 | Campbell et al. |
| 2021/0234372 A1 | 7/2021 | Inoue |
| 2021/0287309 A1 | 9/2021 | Gebhardt et al. |
| 2021/0294405 A1 | 9/2021 | McNamara et al. |
| 2021/0296893 A1 | 9/2021 | Mcnamara et al. |
| 2021/0296928 A1 | 9/2021 | Mcnamara et al. |
| 2021/0298195 A1 | 9/2021 | Barbour |
| 2022/0033517 A1 | 2/2022 | Hendry et al. |
| 2022/0039333 A1 | 2/2022 | Avila |
| 2022/0366517 A1 | 11/2022 | McNamara et al. |
| 2022/0407350 A1 | 12/2022 | McNamara et al. |
| 2023/0208138 A1 | 6/2023 | Mcnamara |
| 2023/0275432 A1 | 8/2023 | McNamara et al. |

FOREIGN PATENT DOCUMENTS

| | | |
|---|---|---|
| CN | 101803148 A | 8/2010 |
| CN | 101895150 A | 11/2010 |
| CN | 102185382 A | 9/2011 |
| CN | 102591921 A | 7/2012 |
| CN | 103163904 A | 6/2013 |
| CN | 103440028 A | 12/2013 |
| CN | 103748757 A | 4/2014 |
| CN | 104144183 A | 11/2014 |
| CN | 104508932 A | 4/2015 |
| CN | 204243874 U | 4/2015 |
| CN | 104715340 A | 6/2015 |
| CN | 104731294 A | 6/2015 |
| CN | 104969434 A | 10/2015 |
| CN | 105406580 A | 3/2016 |
| CN | 106226718 A | 12/2016 |
| CN | 106464523 A | 2/2017 |
| CN | 106716299 A | 5/2017 |
| CN | 107967536 A | 4/2018 |
| EP | 3850462 A1 | 7/2021 |
| EP | 3850465 A4 | 6/2022 |
| JP | 2011123873 A | 6/2011 |
| JP | 2013524317 A | 6/2013 |
| JP | 2017530449 A | 10/2017 |
| KR | 20090012523 A | 2/2009 |
| WO | WO-2008039773 A2 | 4/2008 |
| WO | WO-2010050249 A1 | 5/2010 |
| WO | WO-2014005156 A2 | 1/2014 |
| WO | WO-2015039122 A1 | 3/2015 |
| WO | WO-2015199629 A1 | 12/2015 |
| WO | WO-2017163126 A1 | 9/2017 |
| WO | WO-2018068042 A1 | 4/2018 |
| WO | WO-2019060180 A2 | 3/2019 |
| WO | WO-2019116375 A1 | 6/2019 |
| WO | WO-2019139632 A1 | 7/2019 |
| WO | WO-2019139633 A1 | 7/2019 |
| WO | WO-2020056308 A1 | 3/2020 |
| WO | WO-2020056319 A1 | 3/2020 |
| WO | WO-2020056322 A1 | 3/2020 |
| WO | WO-2020227811 A1 | 11/2020 |
| WO | WO-2022031836 A1 | 2/2022 |

OTHER PUBLICATIONS

Advisory Action mailed on Nov. 13, 2020 for U.S. Appl. No. 16/529,360, filed Aug. 1, 2019, 182 pages.

Advisory Action mailed on Mar. 22, 2023 for U.S. Appl. No. 17/101,784, filed Nov. 23, 2020, 3 pages.

Advisory Action mailed on Oct. 22, 2020 for U.S. Appl. No. 16/528,348, filed Jul. 31, 2019, 3 pages.

Bakar et al., "Microgrid and Load Shedding Scheme During Islanded Mode: a Review," Elsevier, May 26, 2020, vol. 71, pp. 161-169. https://www.sciencedirect.com/science/article/pii/S1364032116311030.

Bird et al., "Wind and Solar Energy Curtailment: Experience and Practices in the United States," National Renewable Energy Lab (NREL), Technical Report NREL/TP-6A20-60983, Mar. 2014, 58 pages.

Chen et al., "Power Trading Model for Distributed Power Generation Systems Based on Consortium Blockchains," Proceedings of the 12th Asia-Pacific Symposium on Internetware, Jul. 2021, pp. 91-98. https://doi.org/10.1145/3457913.3457929.

Choi et al., "Optimal Load Shedding for Maximizing Satisfaction in an Islanded Microgrid," Energies, 2017, vol. 10, pp. 45. doi: 10.3390/en10010045.

EPEX Spot, "How They Occur, What They Mean," 2018, 2 pages. Retrieved from Internet:[URL: https://www.epexspot.com/en/company-info/basics_of_the_power_market/negative_prices ].

ERCOT, Business Procedures, Load Resource Qualification, Initial Qualification and Periodic Testing, Controllable Load Qualification Test Procedure for Ancillary Services (Jun. 1, 2014).

ERCOT, Business Procedures, Load Resource Qualification, Non-Controllable Load Resource Qualification and Testing Procedure, V1.1 (Apr. 1, 2011).

ERCOT, Controllable Load Resource (CLR) Participation in the ERCOT Market (Dec. 20, 2007).

ERCOT, Emergency Response Service Technical Requirements & Scope of Work, Oct. 1, 2018 through Jan. 31, 2019.

ERCOT, ERS QSE Training 101, Updated Apr. 6, 2022.

ERCOT, Large Flexible Load Resource Participation in the ERCOT Region, presentation to Large Flexible Load Task Force (Apr. 26, 2022).

ERCOT, Load Resource Participation in the ERCOT Region, presentation (Sep. 27, 2022).

ERCOT, Nodal Protocols (Oct. 18, 2019)—Applicant particularly notes the following pp. 2-4, 2-5, 2-15, 2-17, 2-24 to 26, 2-28, 2-29, 2-38, 2-41, 2-51, 2-52, 2-58, 2-62 to 63, 2-67, 2-69, 3-77 to 80, 3-176 to 3-186, 3-208 to 213, 3-214 to 216, 4-1 to 4, 4-10, 4-20, 4-25 to 27, 4-59 to 62, 4-64 to 67, 6-100 to 116, 8-1 to 58.

European Patent Application No. 19878191.6, Extended European Search Report dated Jul. 4, 2022.

European Patent Application No. 18900411.2, Extended European Search Report dated Dec. 13, 2021.

European Patent Application No. 19858739.6, Extended European Search Report dated May 31, 2022.

European Patent Application No. 19858812.1, Extended European Search Report dated May 2, 2022.

European Patent Application No. 19861222.8, Extended European Search Report dated May 2, 2022.

(56) References Cited

OTHER PUBLICATIONS

European Patent Application No. 19861223.6, Extended European Search Report dated Apr. 19, 2022.
European Patent Application No. 19877576.9, Extended European Search Report dated Jun. 3, 2022.
European Patent Application No. 20738289.6, Extended European Search Report dated Aug. 8, 2022.
European Patent Application No. 22157111.0, Extended European Search Report dated Aug. 17, 2022.
European Patent Application No. EP18900411.2, Partial Supplementary European Search Report dated Sep. 9, 2021.
Examination Report mailed Jan. 17, 2023 for EP Application No. EP19858812.1 filed on Mar. 25, 2021.
Examination Report mailed Dec. 9, 2022 for EP Application No. EP2019086122.3 filed on Sep. 13, 2019.
Final Office Action mailed Jul. 23, 2020 on for U.S. Appl. No. 16/132,062, filed Sep. 14, 2018, 26 pages.
Final Office Action mailed on May 19, 2020 for U.S. Appl. No. 16/809,111, filed Mar. 4, 2020, 36 pages.
Final Office Action mailed on Jun. 3, 2020 for U.S. Appl. No. 16/528,348, filed Jul. 31, 2019, 33 pages.
Final Office Action mailed on May 28, 2020 for U.S. Appl. No. 16/132,098, filed Sep. 14, 2018, 24 pages.
Final Office Action mailed Jan. 6, 2022 on for U.S. Appl. No. 16/529,360, filed Aug. 1, 2019, 40 pages.
Final Office Action mailed Aug. 9, 2021 on for U.S. Appl. No. 16/529,402, filed Aug. 1, 2019, 43 pages.
Final Office Action mailed Aug. 9, 2021 on for U.S. Appl. No. 16/573,577, filed Sep. 17, 2019, 16 pages.
Final Office Action mailed Jul. 9, 2021 on for U.S. Appl. No. 16/525,142, filed Jul. 29, 2019, 18 pages.
Final Office Action mailed Apr. 11, 2023 on for U.S. Appl. No. 16/529,360, filed Aug. 1, 2019, 46 pages.
Final Office Action mailed on Oct. 1, 2019 for U.S. Appl. No. 16/175,246, filed Oct. 30, 2018, 18 pages.
Final Office Action mailed on Jun. 2, 2023 for U.S. Appl. No. 17/513,558, filed Oct. 28, 2021, 15 pages.
Final Office Action mailed on Dec. 1, 2022 for U.S. Appl. No. 17/101,784 filed Mar. 16, 2013, 14 pages.
Final Office Action mailed on Apr. 17, 2020 for U.S. Appl. No. 16/529,402, filed Aug. 1, 2019, 59 pages.
Final Office Action mailed on Jan. 20, 2023 for U.S. Appl. No. 17/331,440, filed May 26, 2021, 17 pages.
Final Office Action mailed on Jul. 29, 2020 for U.S. Appl. No. 16/132,092, filed Sep. 14, 2018, 5 pages.
Gao et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.
Ghamkhari et al., "Energy and Performance Management of Green Data Centers: A Profit Maximization Approach," IEEE Transactions on Smart Grid, Jun. 2013, vol. 4 (2), pp. 1017-1025.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Ghatikar et al., "Demand Response Opportunities and Enabling Technologies for DataCenters: Findings from Field Studies," Lawrence Berkeley National Laboratory, Aug. 2012, 57 pages.
Hayes, Adam S., "A Cost of Production Model for Bitcoin," Department of Economics, The New School for Social Research, Mar. 2015, 5 pages.
Huang et al., "Data Center Energy Cost Optimization in Smart Grid: a Review," Journal of Zhejiang University (Engineering Science), 2016, vol. 50 (12), pp. 2386-2399.
Hung et al., "Application of Improved Differential Evolution Algorithm for Economic and Emission Dispatch of Thermal Power Generation Plants," Proceedings of the 3rd International Conference on Machine Learning and Soft Computing, Jan. 2019, pp. 93-98. https://doi.org/10.1145/3310986.3311003.

International Search Report and Written Opinion of PCT Application No. PCT/US2018/017955, mailed on Apr. 30, 2018, 22 pages.
International Search Report and Written Opinion of PCT Application No. PCT/US2018/017950, mailed on May 31, 2018, 15 pages.
International Search Report and Written Opinion of PCT Application No. PCT/US2020/044536, mailed on Aug. 26, 2020, 24 pages.
International Search Report and Written Opinion of PCT Application No. PCT/US2020/044539, mailed on Aug. 26, 2020, 7 pages.
International Search Report and Written Opinion of PCT Application No. PCT/US2021/019875, mailed on Apr. 29, 2021, 12 pages.
International Search Report and Written Opinion of PCT Application No. PCT/US2021/045972, mailed on Nov. 15, 2021, 16 pages.
International Search Report and Written Opinion of PCT Application No. PCT/US20/57686, mailed on Feb. 22, 2021, 67 pages.
ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet: <url: https://www.nyiso.com/documents/20142/1391862/Distributed_Energy_Resources_Roadmap.pdf/ec0b3b64-4de2-73e0-ffef-49a4b8b1 b3ca .</url:>.
John, "Stem and CPower to Combine Behind-the-Meter Batteries and Demand Response," Energy Storage, Aug. 8, 2017, 1 pages.
Kewl, "Start-Up From the Heart of Berlin Has Pioneered Decentralized Mobile Mining by Combining Blockchain With Regenerative Energy" Nov. 13, 2017, 3 pages. Retrieved from Internet: [URL: www.crypto-news.net/ start-up-from-the-heart-of-berlin-has-pioneered-decentralized-mobile-mining-by-combining-blockchain-with-regenerative-energy/].
Kiani et al., "Profit Maximization for Geographical Dispersed Green Data Centers," Arxiv.org, Cornell University Library, 201 Olin Library Cornell University Ithaca, Apr. 2015, pp. 1-5.
Kim et al., "Automated di/dt Stressmark Generation for Microprocessor Power Delivery Networks," IEEE/ACM International Symposium on Low Power Electronics and Design, Aug. 2011, pp. 253-258.
Ko., "Ultra-Low Power Challenges for the next Generation ASIC," International Symposium on Low Power Electronics and Design, Jul. 2012, pp. 365-366. https://doi.org/10.1145/2333660.2333743.
Li et al., "iSwitch: Coordinating and Optimizing Renewable Energy Powered Server Clusters," 2012 39th Annual International Symposium on Computer Architecture, Jun. 2012, pp. 512-523.
Li et al., "Research on Evaluation Method of Integrated Energy Service Level of Power Generation Enterprises," Informatics, Environment, Energy and Applications, Jun. 2021, pp. 57-62. https://doi.org/10.1145/3458359.3458372.
Lim et al., "Distributed Load-shedding System for Agent-based Autonomous Microgrid Operations," Energies, 2014, vol. 7(1), pp. 385-401. doi: 10.3390/en7010385.
Lin et al., "Automated Classification of Power Plants by Generation Type," E-Energy '20: Proceedings of the Eleventh ACM International Conference on Future Energy Systems, Jun. 2020, pp. 86-96. https://doi.org/10.1145/3396851.3397708.
Liu et al., "Improved Average Consensus Algorithm Based Distributed Cost Optimization for Loading Shedding of Autonomous Microgrids," International Journal of Electrical Power & Energy Systems, Dec. 2015, vol. 73, pp. 89-96. doi: 10.1016/j.ijepes.2015.04.006.
Marcano et al., "Soil Power ?: Can Microbial Fuel Cells Power Non-Trivial Sensors?," LP-IoT'21, Proceedings of the 1st ACM Workshop on No Power and Low Power Internet-of-Things, Jan. 2022, pp. 8-13. https://doi.org/10.1145/3477085.3478989.
McNamara et al., U.S. Appl. No. 16/175,246, mailed on Oct. 30, 2018, 64 pages.
Miyazaki et al., "Electric-Energy Generation Using Variable-Capacitive Resonator for Power-Free LSI: Efficiency Analysis and Fundamental Experiment," International Symposium on Low Power Electronics and Design, Aug. 2003, pp. 193-198, Doi: 10.1109/LPE.2003.1231861.
Mousavizadeh et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.

(56) References Cited

OTHER PUBLICATIONS

Nawaz et al., "Assisting the Power Generation Sector Toward Sustainability—an Iot Based System for Power Theft Detection With Theft Location Identification," Proceedings of the 2nd International Conference on Computing Advancements, Aug. 2022, pp. 309-315, https://doi.org/10.1145/3542954.3542999.
Non-Final Office Action mailed on Dec. 5, 2019 for U.S. Appl. No. 16/529,360, filed Aug. 1, 2019, 72 pages.
Non-Final Office Action mailed on Dec. 10, 2019 for U.S. Appl. No. 16/596,190, filed Oct. 8, 2019, 72 pages.
Non-Final Office Action mailed on Jun. 12, 2020 for U.S. Appl. No. 16/803,109, filed on Dec. 27, 2020, 31 pages.
Non-Final Office Action mailed on Nov. 14, 2019 for U.S. Appl. No. 16/132,098, filed Sep. 14, 2018, 25 pages.
Non-Final Office Action mailed on Feb. 20, 2020 for U.S. Appl. No. 16/702,894, filed Dec. 4, 2019, 30 pages.
Non-Final Office Action mailed on Nov. 21, 2019 for U.S. Appl. No. 16/529,402, filed Aug. 1, 2019, 57 pages.
Non-Final Office Action mailed Feb. 4, 2021 on for U.S. Appl. No. 16/284,610, filed Feb. 25, 2019, 9 pages.
Non-Final Office Action mailed Apr. 1, 2021 on for U.S. Appl. No. 16/482,495, filed Jul. 31, 2019, 59 pages.
Non-Final Office Action mailed Apr. 2, 2020 on for U.S. Appl. No. 16/132,011, filed Sep. 14, 2018, 5 pages.
Non-Final Office Action mailed Aug. 6, 2012 for U.S. Appl. No. 12/587,564, filed Oct. 8, 2009, 24 pages.
Non-Final Office Action mailed Oct. 6, 2022 on for U.S. Appl. No. 17/331,440, filed May 26, 2021, 4 pages.
Non-Final Office Action mailed Nov. 7, 2022 on for U.S. Appl. No. 17/692,636, filed Mar. 11, 2022, 9 pages.
Non-Final Office Action mailed Dec. 8, 2022 for U.S. Appl. No. 17/340,643, filed Jun. 7, 2021, 5 pages.
Non-Final Office Action mailed Mar. 8, 2021 on for U.S. Appl. No. 16/525,142, filed Jul. 29, 2019, 71 pages.
Non-Final Office Action mailed Dec. 11, 2019 on for U.S. Appl. No. 16/132,062, filed Sep. 14, 2018, 17 pages.
Non-Final Office Action mailed May 11, 2023 for U.S. Appl. No. 18/114,503, filed Feb. 27, 2023.
Non-Final Office Action mailed Feb. 12, 2021 on for U.S. Appl. No. 16/528,348, filed Jul. 31, 2019, 54 pages.
Non-Final Office Action mailed May 14, 2020 on for U.S. Appl. No. 16/834,987, filed Mar. 30, 2020, 30 pages.
Non-Final Office Action mailed Mar. 17, 2023 for U.S. Appl. No. 17/868,381, filed Jul. 19, 2022, 49 pages.
Non-Final Office Action mailed Sep. 21, 2018 for U.S. Appl. No. 15/289,272, filed Oct. 10, 2016, 27 pages.
Non-Final Office Action mailed Sep. 22, 2022 on for U.S. Appl. No. 16/961,386, filed Jul. 10, 2020, 52 pages.
Non-Final Office Action mailed Dec. 24, 2021 on for U.S. Appl. No. 17/128,830, filed Dec. 21, 2020, 4 pages.
Non-Final Office Action mailed Apr. 25, 2023 for U.S. Appl. No. 17/340,643, filed Jun. 7, 2021, 4 pages.
Non-Final Office Action mailed Aug. 25, 2022 on for U.S. Appl. No. 16/529,360, filed Aug. 1, 2019, 91 pages.
Non-Final Office Action mailed Mar. 25, 2021 on for U.S. Appl. No. 16/573,577, filed Sep. 17, 2019, 65 pages.
Non-Final Office Action mailed Mar. 29, 2023 for U.S. Appl. No. 18/066,616, filed Dec. 15, 2022, 120 pages.
Non-Final Office Action mailed Sep. 29, 2022 on for U.S. Appl. No. 17/353,285, filed Jun. 21, 2021, 16 pages.
Non-Final Office Action mailed on Dec. 10, 2019 for U.S. Appl. No. 16/528,348, filed Jul. 31, 2019, 33 pages.
Non-Final Office Action mailed on Apr. 11, 2023 for U.S. Appl. No. 17/353,285, filed Jun. 21, 2021, 4 pages.
Non-Final Office Action mailed on May 11, 2021 for U.S. Appl. No. 16/529,360, filed Aug. 1, 2019, 64 pages.
Non-Final Office Action mailed on Dec. 20, 2022, for U.S. Appl. No. 17/513,558, filed Oct. 28, 2021, 16 pages.
Non-Final Office Action mailed on May 28, 2021 for U.S. Appl. No. 16/658,983, filed Oct. 21, 2019, 21 pages.
Non-Final Office Action mailed on Mar. 30, 2020 for U.S. Appl. No. 16/132,092, filed Sep. 14, 2018, 46 pages.
Notice of Allowance mailed May 12, 2021 on for U.S. Appl. No. 16/132,062, filed Sep. 14, 2018, 2 pages.
Notice of Allowance mailed Oct. 13, 2020 on for U.S. Appl. No. 16/132,098, filed Sep. 14, 2018, 5 pages.
Notice of Allowance mailed Dec. 2, 2022 for U.S. Appl. No. 17/328,337, filed May 24, 2021, 5 pages.
Notice of Allowance mailed Jun. 12, 2020 on for U.S. Appl. No. 16/834,987, filed Mar. 30, 2020, 9 pages.
Notice of Allowance mailed on Jun. 9, 2021 for U.S. Appl. No. 16/528,348, filed Jul. 31, 2019, 11 pages.
Notice of Allowance mailed Dec. 2, 2022 on for U.S. Appl. No. 17/673,318, filed Feb. 16, 2022, 17 pages.
Notice of Allowance mailed Nov. 2, 2022 on for U.S. Appl. No. 17/340,886, filed Jun. 7, 2021, 9 pages.
Notice of Allowance mailed Feb. 8, 2021 on for U.S. Appl. No. 16/132,062, filed Sep. 14, 2018, 21 pages.
Notice of Allowance mailed Feb. 8, 2021 on for U.S. Appl. No. 16/803,109, filed Feb. 27, 2020, 29 pages.
Notice of Allowance mailed Feb. 8, 2021 on for U.S. Appl. No. 16/834,987, filed Mar. 30, 2020, 180 pages.
Notice of Allowance mailed Aug. 10, 2022 on for U.S. Appl. No. 17/328,337, filed May 24, 2021, 9 pages.
Notice of Allowance mailed Jan. 13, 2021 on for U.S. Appl. No. 16/175,246, filed Oct. 30, 2018, 5 pages.
Notice of Allowance mailed Sep. 17, 2020 on for U.S. Appl. No. 16/175,246, filed Oct. 30, 2018, 5 pages.
Notice of Allowance mailed Nov. 19, 2020 on for U.S. Appl. No. 16/132,062, filed Sep. 14, 2018, 7 pages.
Notice of Allowance mailed Apr. 20, 2021 on for U.S. Appl. No. 16/482,495, filed Jul. 31, 2019, 5 pages.
Notice of Allowance mailed Nov. 23, 2022 on for U.S. Appl. No. 17/340,664, filed Jun. 7, 2021, 2 pages.
Notice of Allowance mailed Jan. 25, 2021 on for U.S. Appl. No. 16/132,098, filed Sep. 14, 2018, 5 pages.
Notice of Allowance mailed Jan. 25, 2021 on for U.S. Appl. No. 16/702,894, filed Dec. 4, 2019, 24 pages.
Notice of Allowance mailed Jul. 26, 2021 on for U.S. Appl. No. 16/284,610, filed Feb. 25, 2019, 2 pages.
Notice of Allowance mailed Jan. 27, 2021 on for U.S. Appl. No. 16/132,092, filed Sep. 14, 2018, 8 pages.
Notice of Allowance mailed May 27, 2021 on for U.S. Appl. No. 16/284,610, filed Feb. 25, 2019, 16 pages.
Notice of Allowance mailed Jul. 29, 2020 on for U.S. Appl. No. 16/132,011, filed Sep. 14, 2018, 5 pages.
Notice of Allowance mailed Oct. 29, 2020 on for U.S. Appl. No. 16/132,092, filed Sep. 14, 2018, 8 pages.
Notice of Allowance mailed May 31, 2022 on for U.S. Appl. No. 16/529,402, filed Aug. 1, 2019 13 pages.
Notice of Allowance mailed Oct. 8, 2021 on for U.S. Appl. No. 16/528,348, filed Jul. 31, 2019, 3 pages.
Notice of Allowance mailed on Apr. 2, 2019, for U.S. Appl. No. 16/175,335, filed Oct. 30, 2018, 12 pages.
Notice of Allowance mailed on Mar. 2, 2020, for U.S. Appl. No. 16/596,190, filed Oct. 8, 2019, 15 pages.
Notice of Allowance mailed on Aug. 3, 2022, for U.S. Appl. No. 17/340,886, filed Jun. 7, 2021, 09 pages.
Notice of Allowance mailed on Feb. 3, 2022, for U.S. Appl. No. 16/573,577, filed Sep. 17, 2019, 8 pages.
Notice of Allowance mailed on Apr. 4, 2023, for U.S. Appl. No. 17/673,318, filed Feb. 16, 2022, 2 pages.
Notice of Allowance mailed on Jan. 5, 2022, for U.S. Appl. No. 16/658,983, filed Oct. 21, 2019, 14 pages.
Notice of Allowance mailed on Apr. 6, 2020, for U.S. Appl. No. 16/175,246, filed Oct. 30, 2018, 12 pages.
Notice of Allowance mailed on Mar. 8, 2023, for U.S. Appl. No. 16/961,386, filed Jul. 10, 2020, 2 pages.
Notice of Allowance mailed on Nov. 9, 2022, for U.S. Appl. No. 17/340,664, filed Dec. 16, 2013, 4 pages.
Notice of Allowance mailed on Jan. 13, 2023, for U.S. Appl. No. 16/961,386, filed Jul. 10, 2020, 13 pages.

(56) References Cited

OTHER PUBLICATIONS

Notice of Allowance mailed on Aug. 15, 2019, for U.S. Appl. No. 16/175,146, filed Oct. 30, 2018, 17 pages.
Notice of Allowance mailed on Apr. 18, 2022, for U.S. Appl. No. 17/128,830, filed Dec. 21, 2020, 7 pages.
Notice of Allowance mailed on Feb. 21, 2023, for U.S. Appl. No. 17/340,664, filed Jun. 7, 2021, 2 pages.
Notice of Allowance mailed on Mar. 21, 2023 for U.S. Appl. No. 17/692,636, filed Mar. 11, 2022, 09 pages.
Notice of Allowance mailed on Feb. 23, 2022, for U.S. Appl. No. 16/525,142, filed Jul. 29, 2019, 5 pages.
Notice of Allowance mailed on Feb. 23, 2023, for U.S. Appl. No. 17/353,285, filed Jun. 21, 2021, 5 pages.
Notice of Allowance mailed on Apr. 24, 2023 for U.S. Appl. No. 16/961,386, filed Jul. 10, 2020, 10 pages.
Notice of Allowance mailed on Apr. 24, 2023 for U.S. Appl. No. 17/692,636, filed Mar. 11, 2022, 08 pages.
Notice of Allowance mailed on Apr. 24, 2023 for U.S. Appl. No. 17/750,883, filed May 23, 2022, 10 pages.
Notice of Allowance mailed on Jan. 24, 2022, for U.S. Appl. No. 16/525,142, filed Jul. 29, 2019, 9 pages.
Notice of Allowance mailed on Sep. 24, 2021 for U.S. Appl. No. 16/528,348, filed Jul. 31, 2019, 06 pages.
Notice of Allowance mailed on Jan. 26, 2022, for U.S. Appl. No. 17/328,275, filed May 24, 2021, 10 pages.
Notice of Allowance mailed on Jan. 27, 2020, for U.S. Appl. No. 16/702,931, filed Dec. 4, 2019, 23 pages.
Notice of Allowance mailed on Jul. 29, 2019, for U.S. Appl. No. 16/245,532, filed Jan. 11, 2019, 13 pages.
Pashajavid et al., "A Multimode Supervisory Control Scheme for Coupling Remote Droop-Regulated Microgrids," IEEE Transactions on Smart Grid, May 26, 2020, vol. 9(5), pp. 5381-5392. https://ieeexplore.ieee.org/abstract/document/7888570/.
Pashajavid et al., "Frequency Support for Remote Microgrid Systems With Intermittent Distributed Energy Resources-A Two-level Hierarchical Strategy," IEEE Systems Journal, May 26, 2020, vol. 12(3), pp. 2760-2771. https://ieeexplore.ieee.org/abstract/document/7862156/.
Rahimi, Farrokh, "Using a Transactive Energy Framework," IEEE Electrification Magazine, Dec. 2016, pp. 23-29.
Response to Non-Final Office Action mailed Feb. 6, 2021 for U.S. Appl. No. 12/587,564, filed Oct. 8, 2009, 14 pages.
Response to Non-Final Office Action mailed Dec. 21, 2018 for U.S. Appl. No. 15/289,272, filed Oct. 10, 2016, 10 pages.
Rudez and Mihalic, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Sakurai., "Next-Generation Power-Aware Design," ISLPED, Aug. 2008, pp. 383-384.
Sankaragomathi et al., "Optimal Power and Noise for Analog and Digital Sections of a Low Power Radio Receiver," International Symposium on Low Power Electronics & Design, Aug. 2008, pp. 271-276. https://doi.org/10.1145/1393921.1393993.
Sethuraman et al., "Multicasting Based Topology Generation and Core Mapping for a Power Efficient Networks-On-Chip," International Symposium on Low Power Electronics & Design, Aug. 2007, pp. 399-402. https://doi.org/10.1145/1283780.1283868.
Sharma et al., "Microgrids: A New Approach To Supply-Side Design For Data Centers," 2009, 7 pages.
Singh et al., "Targeted Random Test Generation for Power-Aware Multicore Designs," ACM Transactions on Design Automation of Electronic Systems, Jun. 2012, vol. 17(3), pp. 1-19. https://doi.org/10.1145/2209291.2209298.
Soluna., "Powering the Block Chain," Aug. 2018, version 1.1, 29 pages.
Tao et al., "Simulation Model of Photo-Voltaic Grid-Connected Power Generation," Artificial Intelligence and Advanced Manufacture, Mar. 2022, pp. 2921-2926. https://doi.org/10.1145/3495018.3501208.
U.S. Appl. No. 62/556,880, filed Sep. 11, 2017, 8 pages.
Villani et al., "RF Power Transmission: Energy Harvesting for Self-Sustaining Miniaturized Sensor Nodes," Embedded Networked Sensor Systems, Sensys, Nov. 2021, pp. 592-593. https://doi.org/10.1145/3485730.3493365.
Wang et al., "SHIP: Scalable Hierarchical Power Control for Large-scale Data Centers," 2009 18th International Conference onParallel Architectures and Compilation Techniques, Sep. 2009, pp. 91-100.
Wierman et al., "Opportunities and Challenges for Data Center Demand Response," International Green Computing Conference, IEEE, Nov. 2014, pp. 1-10.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Yang et al., "Investment Value Analysis of Household Rooftop PV Power Generation Project under Carbon Trading Mode," Information Management and Management Science, Aug. 2019, pp. 160-165. https://doi.org/10.1145/3357292.3357330.
Yaramasu V., et al., "High-Power Wind Energy Conversion Systems: State-of-the-Art and Emerging Technologies", Proceedings of the IEEE, May 2015, vol. 103 (5), 49 pages.
Zhang et al., "Calculation of the Carrying Capacity of Distrubuted Power Generation in Distribution Network Under Carbon Peaking and Carbon Neutrality Goals," Electrical, Power and Computer Engineering, Apr. 2022, pp. 1-5. https://doi.org/10.1145/3529299.3529308.
Zhang et al., "Wind Power Generation Prediction Based on LSTM," International Conference on Mathematics and Artificial Intelligence, Apr. 2019, pp. 85-89. https://doi.org/10.1145/3325730.3325735.
Zhou et al., "An Online Power Generation Dispatching Method to Improve the Small Signal Stability of Power System with Fluctuated Wind Power," Electrical Power and Computer Engineering, Apr. 2022, pp. 1-12. https://doi.org/10.1145/3529299.3529302.
Zhou et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
European Patent Application No. 20847753.9, Extended European Search Report dated Jul. 20, 2023.
European Patent Application No. 20847907.1, Extended European Search Report dated Jul. 18, 2023.
Final Office Action mailed Jun. 20, 2023 for U.S. Appl. No. 17/340,643, filed Jun. 7, 2021.
Final Office Action mailed on Aug. 4, 2023 for U.S. Appl. No. 17/868,381, filed Jul. 19, 2022, 45 pages.
International Search Report and Written Opinion of PCT Application No. PCT/US2023/22767, mailed on Aug. 4, 2023, 16 pages.
Non-Final Office Action mailed Jun. 21, 2023 for U.S. Appl. No. 17/896,376, filed Aug. 26, 2022.
Non-Final Office Action mailed Jun. 22, 2023 for U.S. Appl. No. 17/101,784, filed Nov. 23, 2020.
Non-Final Office Action mailed on Aug. 17, 2023 for U.S. Appl. No. 17/331,440, filed May 26, 2021, 16 pages.
Notice of Allowance mailed on Aug. 4, 2023 for U.S. Appl. No. 18/106,093, filed Feb. 6, 2023, 8 pages.
Advisory Action mailed on Sep. 12, 2024 for U.S. Appl. No. 18/106,098, filed Feb. 6, 2023, 2 pages.
AEP Energy, "Behind-the-Meter Generation: Is it for you?" accessed at https://www.aepenergy.com/blog/behind-the-meter-generation-is-it-for-you/ (9 pg. print out), Jul. 25, 2019, 9 pages.
Affidavit of Nathaniel E Frank-White, Nternet Archive, pp. 1-18.
Appalachian Power Company, SCC Docket Search, PUE-2014-00026, Sep. 5, 2023, Ex. (1025), 4 Pages.

(56) References Cited

OTHER PUBLICATIONS

Appalachian Power Company, State Corporation Commission, Commonwealth of Virginia, Nov. 26, 2014, Case No. PUE-2014-00026, Ex. (1019), 51 Pages.
Beltran, H., et al., "Evaluation of Storage Energy Requirements for Constant Production in PV Power Plants," IEEE Transactions on Industrial Electronics, 2012, vol. 60 (3), pp. 1225-1234.
Bird S., et al., "Distributed (Green) Data Centers: a New Concept for Energy, Computing, and Telecommunications," Energy for Sustainable Development, 2014, pp. 83-91.
Blouin D., "Exploring Dual-Power Feeds in Data Centers," Data center, 2 pages.
Brocanelli M., et al., "Reducing the Expenses of Geo-distributed Data Centers With Portable Containerized Modules," Performance Evaluation, 2014, pp. 104-119.
Chein A., et al., "The Zero-Carbon Cloud: High-Value, Dispatchable Demand for Renewable Power Generators," The Electricity Journal, 2015, vol. 28 (8), pp. 110-118.
Cho C., et al., "Active synchronizing control of a microgrid", IEEE Transactions on Power Electronics, 2011, vol. 26(12), 13 pages.
Cholla Energy for U.S. Appl. No. 11/016,456 Declaration of Tajana, pp. 1-173.
Cholla Petitioner's Power of Attorney for U.S. Appl. No. 10/608,433 dated Mar. 31, 2020, 1 page.
Cholla's Petitioner's Power of Attorney for U.S. Appl. No. 11/016,456B2, 1 page.
Cholla United States District Court for the District of Delaware for U.S. Appl. No. 10/608,433, 1 page.
Decision in Petition for Inter Partes Review dated Mar. 13, 2024 for U.S. Appl. No. 10/608,433, IPR2023-01407, 36 Pages.
Declaration of Andres E. Carvallo mailed Sep. 12, 2023 for U.S. Appl. No. 10/608,433, IPR2023-01407, (Ex. 1003), 103 Pages.
Emergency Demand Response Program Manual, New York ISO, Manual 7, Nov. 2022, Ex. (1010), 50 Pages.
European Patent Application No. 20880611.7, Extended European Search Report dated Nov. 3, 2023.
European Patent Application No. 21856804.6, Extended European Search Report dated Mar. 7, 2024.
Examination Report mailed Aug. 12, 2024 for EP Application No. EP19858812.1 filed on Sep. 13, 2019.
Final Office Action mailed Feb. 14, 2024 on for U.S. Appl. No. 17/331,440, filed May 26, 2021, 21 pages.
Final Office Action mailed Feb. 15, 2024 for U.S. Appl. No. 17/340,643, filed Jun. 7, 2021, 25 pages.
Final Office Action mailed on Dec. 6, 2023 for U.S. Appl. No. 17/896,376, filed Aug. 26, 2022, 14 pages.
Final Office Action mailed on Jan. 11, 2024 for U.S. Appl. No. 17/101,784, filed Nov. 23, 2020, 13 pages.
Final Office Action mailed on Oct. 13, 2023 for U.S. Appl. No. 18/066,616, filed Dec. 15, 2023, 10 pages.
Gangloff M., "Appalachian Power'sproposed fee targets usersof solar panels," OBM and Cholla Energy, Sep. 8, 2014, Ex. (1017), 3 Pages.
Hua Y., et al., "Building fuel powered supercomputing data center at low cost", Proceedings of the 29th ACM on International Conference on Supercomputing—describes DG systems and associated datacenters, 2015, 10 pages.
Huang Q., et al., "Power Consumption of Virtual Machine Live Migration in Clouds", Third international conference on communications and mobile computing IEEE, 2011, 4 pages.
International Search Report and Written Opinion of PCT Application No. PCT/US2024/15772, mailed on Jun. 6, 2024, 8 pages.
Lancium, At the Nexus of Energy and Blockchain Technology, pp. 1-242.
Letter from W. Hix, Indiana Michigan Power, OBM and Cholla Energy, 2014, Ex. (1035), 7 Pages.
Li C., et al., "Enabling distributed generation powered sustainable high-performance data center", 19th International Symposium on High Performance Computer Architecture IEEE, 2013, 12 pages.

Li C., et al., "SolarCore: Solar Energy Driven Multi-core Architecture Power Management," IEEE, 2011, pp. 205-216.
Madrigal R., Overview of Reliability Demand Response Resource, OBM and Cholla Energy, May 8, 2014, Ex. (1014), 74 Pages.
Main I., "Virginia energy policy made interesting," Who's afraid of a Carbon Rule?, Power for the People VA, May 2014, Ex. (1018), 10 Pages.
Main I., Virginia regulators approve Appalachian Power's"solar tax", Dec. 1, 2014, Power for the People VA, Ex. (1016), 5 Pages.
Martinot E., "Grid Integration of Renewable Energy: Flexibility, Innovation, and Experience," Annu. Rev. Environ. Resour, 2016, vol. 41, pp. 223-251.
Meagher K., et al., "The Enterprise Data Center as a Microgrid", Uptime Institute Symposium describes data centers as a microgrid that capable of operating in islanding mode and grid connected mode, 2010, 8 pages.
Miller, "Large Reno Project to Generate its own Power" DataCenter Knowledge, Nov. 15, 2010, accessed at https://www.datacenterknowledge.com/energy-power-supply/large-reno-project-to-generate-its-own-power, 2010, 9 pages.
Miller R., "Data Center Knowledge," Schneider Buys APC for $6.1 Billion, 2006, 2 pages.
Non-Final Office Action mailed Jul. 5, 2024 on for U.S. Appl. No. 18/106,098, filed Feb. 6, 2023, 13 pages.
Non-Final Office Action mailed Nov. 9, 2023 for U.S. Appl. No. 17/340,643, filed Jun. 7, 2021, 21 pages.
Non-Final Office Action mailed Mar. 13, 2024 for U.S. Appl. No. 18/066,616, filed Dec. 15, 2022, 12 pages.
Non-Final Office Action mailed Oct. 13, 2023 for U.S. Appl. No. 18/106,102, filed Feb. 6, 2023, 18 pages.
Non-Final Office Action mailed Jun. 14, 2024 on for U.S. Appl. No. 17/101,784, filed Nov. 23, 2020, 14 pages.
Non-Final Office Action mailed Aug. 15, 2024 on for U.S. Appl. No. 18/143,280, filed Apr. 5, 2023, 11 pages.
Non-Final Office Action mailed Jan. 18, 2024 for U.S. Appl. No. 18/139,010, filed Apr. 25, 2023, 12 pages.
Non-Final Office Action mailed Nov. 21, 2023 for U.S. Appl. No. 17/513,558, filed Oct. 28, 2023, 16 pages.
Non-Final Office Action mailed Feb. 28, 2024 for U.S. Appl. No. 17/402,175, filed Aug. 13, 2021, 11 pages.
Non-Final Office Action mailed Aug. 29, 2024 on for U.S. Appl. No. 18/106,102, filed Feb. 6, 2023, 12 pages.
Non-Final Office Action mailed Mar. 29, 2024 for U.S. Appl. No. 18/367,673, filed Sep. 3, 2023, 9 Pages.
Non-Final Office Action mailed Nov. 30, 2023 for U.S. Appl. No. 18/143,277, filed May 4, 2023, 26 pages.
Non-Final Office Action mailed Oct. 5, 2023 for U.S. Appl. No. 17/479,750, filed Sep. 20, 2021, 4 pages.
Non-Final Office Action mailed Oct. 5, 2023 for U.S. Appl. No. 18/106,098, filed Feb. 6, 2023, 5 pages.
Non-Final Office Action mailed on Jul. 24, 2024 for U.S. Appl. No. 18/535,065, filed Dec. 11, 2023, 29 pages.
Non-Final Office Action mailed on Apr. 30, 2024 for U.S. Appl. No. 18/139,010, filed Apr. 25, 2023, 5 pages.
Notice of Allowance mailed on Nov. 3, 2023 for U.S. Appl. No. 18/106,093, filed Feb. 6, 2023, 4 pages.
Notice of Allowance mailed on Sep. 5, 2024, for U.S. Appl. No. 17/331,440, filed May 26, 2021, 5 pages.
Notice of Allowance mailed on May 7, 2024, for U.S. Appl. No. 18/114,503, filed Feb. 27, 2023, 5 pages.
Notice of Allowance mailed on Sep. 10, 2024, for U.S. Appl. No. 17/896,376, filed Aug. 26, 2022, 5 pages.
Notice of Allowance mailed on Dec. 11, 2023 for U.S. Appl. No. 17/868,381, filed Jul. 19, 2022, 10 pages.
Notice of Allowance mailed on Jun. 13, 2024, for U.S. Appl. No. 17/513,558, filed Oct. 28, 2021, 9 pages.
Notice of Allowance mailed on Sep. 14, 2023 for U.S. Appl. No. 16/529,360, filed Aug. 1, 2019, 8 pages.
Notice of Allowance mailed on May 15, 2024, for U.S. Appl. No. 18/143,277, filed May 4, 2023, 11 pages.
Notice of Allowance mailed on Apr. 17, 2024 for U.S. Appl. No. 17/479,750, filed Sep. 20, 2021, 5 pages.

(56) References Cited

OTHER PUBLICATIONS

Notice of Allowance mailed on Jun. 21, 2024 for U.S. Appl. No. 17/402,175, filed Aug. 13, 2021, 5 pages.
Notice of Allowance mailed on Nov. 22, 2023 for U.S. Appl. No. 18/106,093, filed Feb. 6, 2023, 8 pages.
Notice of Allowance mailed on Jan. 23, 2024 for U.S. Appl. No. 18/114,503, filed Feb. 27, 2023, 5 pages.
Notice of Allowance mailed on Sep. 23, 2024, for U.S. Appl. No. 17/513,558, filed Oct. 28, 2021, 5 pages.
Notice of Allowance mailed on Oct. 25, 2023 for U.S. Appl. No. 16/529,360, filed Aug. 1, 2019, 8 pages.
Notice of Allowance mailed on Sep. 29, 2023 for U.S. Appl. No. 18/114,503, filed Feb. 27, 2023, 5 pages.
Notice of Allowance mailed on Mar. 5, 2024 for U.S. Appl. No. 18/106,102, filed May 2, 2023, 8pages.
Notice of Allowance mailed on Mar. 5, 2024 for U.S. Appl. No. 18/143,280, filed May 4, 2023, 10 pages.
Office of Electricity, "Demand Response," OBM and Cholla Energy, Ex. (1013), 3 Pages.
Patent Owner Preliminary Response to Petition, dated Dec. 20, 2023, Inter Partes Review for U.S. Appl. No. 10/608,433, IPR2023-01407, 71 Pages.
Petition for Inter Partes Review For U.S. Appl. No. 11/016,456. pp. 1-108.
Petition for Inter Partes Review mailed on Sep. 13, 2023 for U.S. Appl. No. 10/608,433, IPR2023-01407, 92 Pages.
Pitt D., et al., "Analyzing the Costs and Benefits of Distributed Solar Generation in Virginia," OBM and Cholla Energy, 2014, Ex. (1022), 70 Pages.
Pitt D., et al., "Assessing the Value of Distributed Solar Energy Generation," Curr Sustainable Renewable Energy, 2015, vol. 2, Ex. (1021) pp. 105-113.
Pitt D., et al., "Optimizing the Grid Integration of Distributed Solar Energy," Final Presidential Research Quest Fund Grant Report Virginia Commonwealth University, OBM and Cholla Energy, Apr. 2018, Ex. (1023), 78 Pages.
PJM, Working to Perfect the Flow of Energy, OBM and Cholla Energy, Manual 11: Energy & Ancillary Services Market Operations, May 11, 2017, 223 Pages.
Politics Bureaucracy and Justice, West Texas A&M University, OBM and Cholla Energy, 2016, vol. 5(1), Ex. 1024, 41 Pages.
Power of Attorney for Petitioner for U.S. Appl. No. 10/608,433 OBM, Inc, 3 pages.
Power of Attorney for Petitioner OBM, Inc for U.S. Appl. No. 11/016,456, pp. 1-3.
Powers J., "Implementation Overview for PDR," OBM and Cholla Energy, Aug. 26, 2014, Ex. (1012), 11 Pages.
Rasmussen N., Impact of Leading Power Factor on Data Center Generator Systems, Schneider Electric—Data Center Science Center, pp. 1-19.
Rasmussen N., Impact of Leading Power Factor on Data Center Generator Systems, Schneider Electric, 1 page.
Reisinger W T., Public Utilities Law, OBM and Cholla Energy, 2014, Ex. (1020), 33 Pages.

Requirement for Restriction/Election mailed on Dec. 12, 2023 for U.S. Appl. No. 17/402,175, filed Aug. 13, 2021, 5 pages.
Resource Testing Guidelines dated May 18, 2023, Operating Procedure, California ISO, Procedure No. 5330, Ex. (1009), 32 Pages.
Tajana Simunic Rosing., "Energy-efficient Computing, Computer Architecture, Embedded Systems," 858, pp. 1-31.
Tang C.J et al., "A Load Control Method for Small Data Centers Participating in Demand Response Programs," Future Generation Computer Systems, 2014, vol. 32 , pp. 232-245.
The Wayback Machine. SCC Case Information, Public Comments/Notices, 2015, 5, Ex. (1032), 1 Page.
The Wayback Machine. SCC Case Information, Public Comments/Notices, 2015, 5, Ex. (1033), 5 Pages.
Trowler D., et al., "Bi-Directional Inverter and Energy Storage System," Texas Instruments Analog Design Contest, University of Arkansas, May 2008, pp. 1-29.
Virginia S.C .C . Tariff No. -2425 Appalachian Power Company, OBM and Cholla Energy, Jan. 25, 2015, Ex. (1027), 64 Pages.
Virginia S.C .C . Tariff No. -2425 Appalachian Power Company, OBM and Cholla Energy, Jan. 25, 2015, Ex. (1028), 53 Pages.
Virginia S.C .C . Tariff No. -2425 Appalachian Power Company, OBM and Cholla Energy, Jan. 25, 2015, Ex. (1029), 49 Pages.
Virginia S.C .C . Tariff No. -2425 Appalachian Power Company, OBM and Cholla Energy, Jan. 25, 2015, Ex. (1030), 72 Pages.
Virginia S.C .C . Tariff No. -2425 Appalachian Power Company, OBM and Cholla Energy, Jan. 25, 2015, Ex. (1031), 81 Pages.
Virginia S.C .C . Tariff No. -2425 Appalachian Power Company, PUE-2014-00026, Jan. 14, 2014, Ex. (1026), 69 Pages.
Virginia S.C.C. Tarrif No. -2425 Appalachian Power Company dated Jan. 14, 2014, PUE-2014-00026, Ex. (1005), 389 Pages.
Wang R., et al., "Datacenters as Controllable Load Resources in the Electricity Market," 2013 IEEE 33rd International Conference on Distributed Computing Systems, Ex. (1014), 10 Pages.
White Papers, Schneider Electric, Internet Archive Wayback Machine, pp. 1-10.
Whited M., et al., "The Problem with Fixed Charges for Electricity," Prepared for Consumers Union, Feb. 9, 2016, Ex. (1034), 58 Pages.
Yang F., et al., "Large-Scale and Extreme-Scale Computing with Stranded Green Power: Opportunities and Costs," IEEE Transactions on Parallel and Distributed Systems, 2018, vol. 29(5), pp. 1103-1116.
Yang F., et al., "ZCCloud: Exploring Wasted Green Power for High-Performance Computing," IEEE Computer Society, 2016, pp. 1051-1060.
Yang F., et al., "ZCCloud: Exploring Wasted Green Power for High-Performance Computing," IEEE Xplore, 2016, pp. 1-4.
Zeeman J., et al., "Emerging Business Models for Local Distribution Companies in Ontario", 2016, 131 pages.
Zhabelova C., et al., "Data Center Power Dynamics Within the Settings of Regional Power Grid," IEEE, pp. 1-5.
Andoni, et al., "Blockchain Technology in the Energy Sector: a Systematic Review of Challenges and Opportunities, "Renewable and Sustainable Energy Reviews, 2019, vol. 100, pp. 143-174.
Final Office Action mailed Oct. 25, 2024 on for U.S. Appl. No. 17/101,784, filed Nov. 23, 2020, 17 pages.
Non-Final Office Action mailed Oct. 9, 2024 for U.S. Appl. No. 17/340,643, filed Jun. 7, 2021, 10 pages.
Non-Final Office Action mailed Oct. 9, 2024 for U.S. Appl. No. 18/106,098, filed Feb. 6, 2023, 15 pages.

METHODS AND SYSTEMS FOR DISTRIBUTED POWER CONTROL OF FLEXIBLE DATACENTERS

CROSS REFERENCE TO RELATED APPLICATIONS

This application is a Continuation of copending U.S. application Ser. No. 17/692,636, filed on Mar. 11, 2022, issued as U.S. Pat. No. 11,669,114, on Jun. 6, 2023, which is a Continuation of U.S. application Ser. No. 17/328,275, filed on May 24, 2021, issued as U.S. Pat. No. 11,275,427, on Mar. 15, 2022, which is a Continuation of U.S. application Ser. No. 16/132,092, filed Sep. 14, 2018 and issued as U.S. Pat. No. 11,016,553 on May 25, 2021. The disclosures set forth in the referenced applications are incorporated herein by reference in their entirety.

FIELD OF THE INVENTION

This specification relates to a system for controlling the use of "behind-the-meter" power.

BACKGROUND OF THE INVENTION

The price for power distributed through regional and national electric power grids is composed of Generation, Administration, and Transmission & Distribution ("T&D") costs. T&D costs are a significant portion of the overall price paid by consumers for electricity. T&D costs include capital costs (land, equipment, substations, wire, etc.), electrical transmission losses, and operation and maintenance costs. Electrical power is typically generated at local stations (e.g., coal, natural gas, nuclear, and renewable sources) in the Medium Voltage class of 2.4 kVAC to 69 kVAC before being converted in an AC-AC step up transformer to High Voltage at 115 kVAC or above. T&D costs are accrued at the point the generated power leaves the local station and is converted to High Voltage electricity for transmission onto the grid.

Local station operators are paid a variable market price for the amount of power leaving the local station and entering the grid. However, grid stability requires that a balance exist between the amount of power entering the grid and the amount of power used from the grid. Grid stability and congestion is the responsibility of the grid operator and grid operators take steps, including curtailment, to reduce power supply from local stations when necessary. Frequently, the market price paid for generated power will be decreased in order to disincentivize local stations from generating power. In some cases, the market price will go negative, resulting in a cost to local station operators who continue to supply power onto a grid. Grid operators may sometimes explicitly direct a local station operator to reduce or stop the amount of power the local station is supplying to the grid.

Power market fluctuations, power system conditions such as power factor fluctuation or local station startup and testing, and operational directives resulting in reduced or discontinued generation all can have disparate effects on renewal energy generators and can occur multiple times in a day and last for indeterminate periods of time. Curtailment, in particular, is particularly problematic.

According to the National Renewable Energy Laboratory's Technical Report TP-6A20-60983 (March 2014):

[C]urtailment [is] a reduction in the output of a generator from what it could otherwise produce given available resources (e.g., wind or sunlight), typically on an involuntary basis. Curtailments can result when operators or utilities command wind and solar generators to reduce output to minimize transmission congestion or otherwise manage the system or achieve the optimal mix of resources. Curtailment of wind and solar resources typically occurs because of transmission congestion or lack of transmission access, but it can also occur for reasons such as excess generation during low load periods that could cause baseload generators to reach minimum generation thresholds, because of voltage or interconnection issues, or to maintain frequency requirements, particularly for small, isolated grids. Curtailment is one among many tools to maintain system energy balance, which can also include grid capacity, hydropower and thermal generation, demand response, storage, and institutional changes. Deciding which method to use is primarily a matter of economics and operational practice.

"Curtailment" today does not necessarily mean what it did in the early 2000s. Two sea changes in the electric sector have shaped curtailment practices since that time: the utility-scale deployment of wind power, which has no fuel cost, and the evolution of wholesale power markets. These simultaneous changes have led to new operational challenges but have also expanded the array of market-based tools for addressing them.

Practices vary significantly by region and market design. In places with centrally-organized wholesale power markets and experience with wind power, manual wind energy curtailment processes are increasingly being replaced by transparent offer-based market mechanisms that base dispatch on economics. Market protocols that dispatch generation based on economics can also result in renewable energy plants generating less than what they could potentially produce with available wind or sunlight. This is often referred to by grid operators by other terms, such as "downward dispatch." In places served primarily by vertically integrated utilities, power purchase agreements (PPAs) between the utility and the wind developer increasingly contain financial provisions for curtailment contingencies.

Some reductions in output are determined by how a wind operator values dispatch versus non-dispatch. Other curtailments of wind are determined by the grid operator or in response to potential reliability events. Still other curtailments result from overdevelopment of wind power in transmission-constrained areas.

Dispatch below maximum output (curtailment) can be more of an issue for wind and solar generators than it is for fossil generation units because of differences in their cost structures. The economics of wind and solar generation depend on the ability to generate electricity whenever there is sufficient sunlight or wind to power their facilities.

Because wind and solar generators have substantial capital costs but no fuel costs (i.e., minimal variable costs), maximizing output improves their ability to recover capital costs. In contrast, fossil generators have higher variable costs, such as fuel costs. Avoiding these costs can, depending on the economics of a specific generator, to some degree reduce the financial impact of curtailment, especially if the generator's capital costs are included in a utility's rate base.

As such, curtailment may result in available energy being wasted (which may not be true to the same extent for fossil generation units which can simply reduce the amount of fuel that is being used). With wind generation, in particular, it may also take some time for a wind farm to become fully operational following curtailment. As such, until the time that the wind farm is fully operational, the wind farm may not be operating with optimum efficiency and/or may not be able to provide power to the grid.

BRIEF SUMMARY OF THE INVENTION

In an example, a distributed power control system is described. The distributed power control system can comprise a flexible datacenter comprising (i) a plurality of computing systems powered by a behind-the-meter power input system, (ii) the behind-the-meter power input system configured to receive power from a behind-the-meter power source and deliver power to the plurality of computing systems, and (iii) a datacenter control system configured to control the plurality of computing systems and the behind-the-meter power input system. The distributed power control system can also comprise a remote master control system configured to issue instructions to the flexible datacenter that affect an amount of behind-the-meter power consumed by the flexible datacenter. The distributed power control system can also comprise one or more processors and data storage comprising a first set of instructions that, when executed by the one or more processors, cause the datacenter control system to perform operations. The operations can comprise receiving a first operational directive from a local station control system, where the local station control system is configured to at least partially control the behind-the-meter power source, and where the first operational directive is an operational directive for the flexible datacenter to ramp-down power consumption. The operations can also comprise, in response to receiving the first operational directive, causing the plurality of computing systems of the flexible datacenter to perform a first set of predetermined operations correlated with the first operational directive.

In another example, a method performed by a datacenter control system of a flexible datacenter is described. The flexible datacenter can also comprise (i) a plurality of computing systems powered by a behind-the-meter power input system and (ii) the behind-the-meter power input system configured to receive power from a behind-the-meter power source and deliver power to the plurality of computing systems. The datacenter control system can be configured to control the plurality of computing systems and the behind-the-meter power input system, and a remote master control system can be configured to issue instructions to the flexible datacenter that affect an amount of behind-the-meter power consumed by the flexible datacenter. The method can involve receiving a first operational directive from a local station control system, where the local station control system is configured to at least partially control the behind-the-meter power source, and where the first operational directive is an operational directive for the flexible datacenter to ramp-down power consumption. The method can also involve, in response to receiving the first operational directive, causing the plurality of computing systems of the flexible datacenter to perform a first set of predetermined operations correlated with the first operational directive.

In another example, a non-transitory computer readable medium having stored thereon instructions, that when executed by one or more processors of a datacenter control system of a flexible datacenter, cause the datacenter control system to perform operations is described. The operations can comprise receiving a first operational directive from a local station control system, where the local station control system is configured to at least partially control a behind-the-meter power source, and where the first operational directive is an operational directive for the flexible datacenter to ramp-down power consumption. The flexible datacenter can also comprise (i) a plurality of computing systems powered by a behind-the-meter power input system and (ii) the behind-the-meter power input system configured to receive power from the behind-the-meter power source and deliver power to the plurality of computing systems. The datacenter control system can be configured to control the plurality of computing systems and the behind-the-meter power input system, and a remote master control system can be configured to issue instructions to the flexible datacenter that affect an amount of behind-the-meter power consumed by the flexible datacenter. The operations can also comprise, in response to receiving the first operational directive, causing the plurality of computing systems of the flexible datacenter to perform a first set of predetermined operations correlated with the first operational directive.

Other aspects of the present invention will be apparent from the following description and claims.

DETAILED DESCRIPTION OF THE INVENTION

Figure 1:
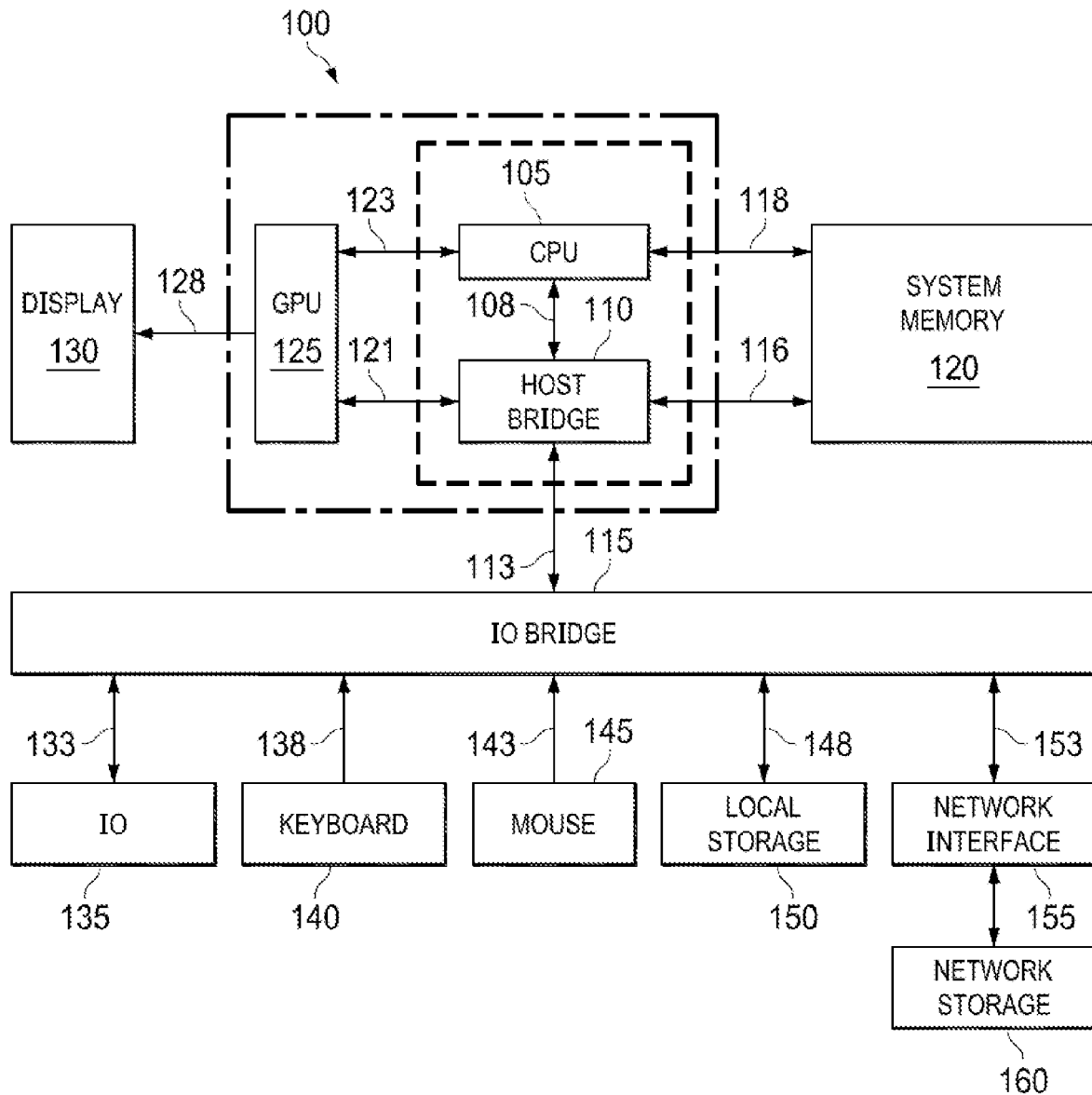
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one having ordinary skill in the art are not described to avoid obscuring the description of the present invention.

The embodiments provided herein relate to providing an electrical load "behind the meter" at local stations such that generated power can be directed to the behind-the-meter load instead of onto the grid, typically for intermittent periods of time. "Behind-the-meter" power is power that is received from a power generation system (for instance, but not limited to, a wind or solar power generation system) prior to the power undergoing AC-to-AC step up transformation for transmission to the grid. "Behind-the-meter" power includes power that is received from a power generation system (for instance, but not limited to, a wind or solar power generation system) prior to the power undergoing AC-to-AC step-up transformation to High Voltage class AC power for transmission to the grid. Behind-the-meter power may therefore include power drawn directly from an intermittent grid-scale power generation system (e.g. a wind farm or a solar array) and not from the grid.

The embodiments herein provide an economic advantage to local station operators when, for example, the power system conditions exhibit excess local power generation at a local station level, excess local power generation that a grid cannot receive, local power generation that is subject to economic curtailment, local power generation that is subject to reliability curtailment, local power generation that is subject to power factor correction, low local power generation, start up local power generation situations, transient local power generation situations, conditions where the cost for power is economically viable (e.g., low cost for power), or testing local power generation situations where there is an economic advantage to using local behind-the-meter power generation. This is not least because the excess power can be utilized by the behind-the-meter electrical load rather than going to waste. In addition, by providing an electrical load behind-the-meter rather than connected to the grid, electrical transmission losses resulting from transmission of power through the grid can be reduced. In addition, any degradation in the power generation systems which may result from curtailment may be reduced.

Preferably, controlled computing systems that consume electrical power through computational operations can provide a behind-the-meter electrical load that can be granularly ramped up and down quickly under the supervision of control systems that monitor power system conditions and direct the power state and/or computational activity of the computing systems. In one embodiment, the computing systems preferably receive all their power for computational operations from a behind-the-meter power source. In another embodiment, the computing systems may additionally include a connection to grid power for supervisory and communication systems or other ancillary needs. In yet another embodiment, the computing systems can be configured to switch between behind-the-meter power and grid power under the direction of a control system.

Among other benefits, a computing system load with controlled granular ramping allows a local station to avoid negative power market pricing and to respond quickly to grid directives.

Various computing systems can provide granular behind-the-meter ramping. Preferably the computing systems perform computational tasks that are immune to, or not substantially hindered by, frequent interruptions or slow-downs in processing as the computing systems ramp up and down. In one embodiment, control systems can activate or de-activate one or more computing systems in an array of similar or identical computing systems sited behind the meter. For example, one or more blockchain miners, or groups of blockchain miners, in an array may be turned on or off. In another embodiment, control systems can direct time-insensitive computational tasks to computational hardware, such as CPUs and GPUs, sited behind the meter, while other hardware is sited in front of the meter and possibly remote from the behind-the-meter hardware. Any parallel computing processes, such as Monte Carlo simulations, batch processing of financial transactions, graphics rendering, and oil and gas field simulation models, are all good candidates for such interruptible computational operations.

In accordance with one or more embodiments of the present invention, computing systems that consume behind-the-meter power generated by a behind-the-meter power source can be part of a flexible datacenter deployed in association with the behind-the-meter power source (e.g., on site, near the source). Over time, an amount of behind-the-meter power generated by the behind-the-meter power source can vary, and it is desirable for the computing systems that consume the behind-the-meter power to perform computational operations to be able to dynamically adapt to changes in available behind-the-meter power. To facilitate this, the flexible datacenter that includes such computing systems (and thus consumes generated behind-the-meter power) can be configured to modulate power delivery to at least a portion of the computing systems based on monitored power system conditions and/or an operational directive. For example, the flexible datacenter may ramp-up to a full capacity status, ramp-down to an off capacity status, or dynamically reduce power consumption, act a load balancer, or adjust the power factor. As a more particular example, if there is an emergency situation in which there is insufficient behind-the-meter power available and/or an error with one or more components of a behind-the-meter power source (e.g., a fault rendering one or more wind turbines at least temporarily inoperable), the flexible datacenter might need to ramp down its power consumption. Any one or more of these activities may be performed using any or all of: behind-the-meter generated power, behind-the-meter stored power, and/or grid power. Advantageously, the flexible datacenter may perform computational operations, such as blockchain hashing operations or simulations using clean and renewable energy that would otherwise be wasted.

In some cases, it may be desirable for flexible datacenters to be able to efficiently and effectively work with a variety of different behind-the-meter power sources and associated local station control systems. In particular, when certain conditions arise, such as emergency situations involving behind-the-meter power generation, the associated local station control systems can engage in communication with the appropriate flexible datacenters and direct those flexible datacenters to perform certain functions. Accordingly, in one or more embodiments of the present invention, methods and systems for a distributed power control system distribute control amongst at least two different control systems including, at a minimum, a datacenter control system associated with the flexible datacenter (e.g., a control system geographically located on site with the flexible datacenter) and a local station control system that is configured to at least partially control the behind-the-meter power source and/or monitor conditions related to the behind-the-meter power source. Thus, when the local station control system determines that the flexible datacenter should modulate power consumption (which could occur for a variety of reasons, some of which could be related to an amount of behind-the-meter power currently being generated or expected to be generated in the future), the local station control system can directly or indirectly (e.g., via another control system) send to the flexible datacenter an operational directive associated with the power consumption ramp-down condition so that the flexible datacenter can respond accordingly, such as by modulating power consumption in a particular way.

Other control systems can be implemented as part of the distributed power control system as well, such as a remote master control system, which can control certain functions of the behind-the-meter power source and/or control certain functions of the datacenter control system. In some embodiments, in addition to or alternative to the local station control system operations noted above, the remote master control system itself can determine that the flexible datacenter should modulate power consumption and can thus send to the flexible datacenter an operational directive associated with the power consumption ramp-down condition so that the flexible datacenter can respond accordingly.

FIG. 1 shows a computing system 100 in accordance with one or more embodiments of the present invention. Computing system 100 may include one or more central processing units (singular "CPU" or plural "CPUs") 105, host bridge 110, input/output ("IO") bridge 115, graphics processing units (singular "GPU" or plural "GPUs") 125, and/or application-specific integrated circuits (singular "ASIC or plural "ASICs") (not shown) disposed on one or more printed circuit boards (not shown) that are configured to perform computational operations. Each of the one or more CPUs 105, GPUs 125, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 105 may be a general purpose computational device typically configured to execute software instructions. CPU 105 may include an interface 108 to host bridge 110, an interface 118 to system memory 120, and an interface 123 to one or more IO devices, such as, for example, one or more GPUs 125. GPU 125 may serve as a specialized computational device typically configured to perform graphics functions related to frame buffer manipulation. However, one of ordinary skill in the art will recognize that GPU 125 may be used to perform non-graphics related functions that are computationally intensive. In certain embodiments, GPU 125 may interface 123 directly with CPU 125 (and interface 118 with system memory 120 through CPU 105). In other embodiments, GPU 125 may interface 121 with host bridge 110 (and interface 116 or 118 with system memory 120 through host bridge 110 or CPU 105 depending on the application or design). In still other embodiments, GPU 125 may interface 133 with IO bridge 115 (and interface 116 or 118 with system memory 120 through host bridge 110 or CPU 105 depending on the application or design). The functionality of GPU 125 may be integrated, in whole or in part, with CPU 105.

Host bridge 110 may be an interface device configured to interface between the one or more computational devices and IO bridge 115 and, in some embodiments, system memory 120. Host bridge 110 may include an interface 108 to CPU 105, an interface 113 to IO bridge 115, for embodiments where CPU 105 does not include an interface 118 to system memory 120, an interface 116 to system memory 120, and for embodiments where CPU 105 does not include an integrated GPU 125 or an interface 123 to GPU 125, an interface 121 to GPU 125. The functionality of host bridge 110 may be integrated, in whole or in part, with CPU 105. IO bridge 115 may be an interface device configured to interface between the one or more computational devices and various IO devices (e.g., 140, 145) and IO expansion, or add-on, devices (not independently illustrated). IO bridge 115 may include an interface 113 to host bridge 110, one or more interfaces 133 to one or more IO expansion devices 135, an interface 138 to keyboard 140, an interface 143 to mouse 145, an interface 148 to one or more local storage devices 150, and an interface 153 to one or more network interface devices 155. The functionality of IO bridge 115 may be integrated, in whole or in part, with CPU 105 or host bridge 110. Each local storage device 150, if any, may be a solid-state memory device, a solid-state memory device array, a hard disk drive, a hard disk drive array, or any other non-transitory computer readable medium. Network interface device 155 may provide one or more network interfaces including any network protocol suitable to facilitate networked communications.

Computing system 100 may include one or more network-attached storage devices 160 in addition to, or instead of, one or more local storage devices 150. Each network-attached storage device 160, if any, may be a solid-state memory device, a solid-state memory device array, a hard disk drive, a hard disk drive array, or any other non-transitory computer readable medium. Network-attached storage device 160 may or may not be collocated with computing system 100 and may be accessible to computing system 100 via one or more network interfaces provided by one or more network interface devices 155.

One of ordinary skill in the art will recognize that computing system 100 may be a conventional computing system or an application-specific computing system. In certain embodiments, an application-specific computing system may include one or more ASICs (not shown) that are configured to perform one or more functions, such as hashing, in a more efficient manner. The one or more ASICs (not shown) may interface directly with CPU 105, host bridge 110, or GPU 125 or interface through IO bridge 115. Alternatively, in other embodiments, an application-specific computing system may be reduced to only those components necessary to perform a desired function in an effort to reduce one or more of chip count, printed circuit board footprint, thermal design power, and power consumption. The one or more ASICs (not shown) may be used instead of one or more of CPU 105, host bridge 110, IO bridge 115, or GPU 125. In such systems, the one or more ASICs may incorporate sufficient functionality to perform certain network and computational functions in a minimal footprint with substantially fewer component devices.

As such, one of ordinary skill in the art will recognize that CPU 105, host bridge 110, IO bridge 115, GPU 125, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 100 is merely exemplary and not intended to limit the type, kind, or configuration of component devices that constitute a computing system 100 suitable for performing computing operations in accordance with one or more embodiments of the present invention.

One of ordinary skill in the art will recognize that computing system 100 may be a stand alone, laptop, desktop, server, blade, or rack mountable system and may vary based on an application or design.

Figure 2:
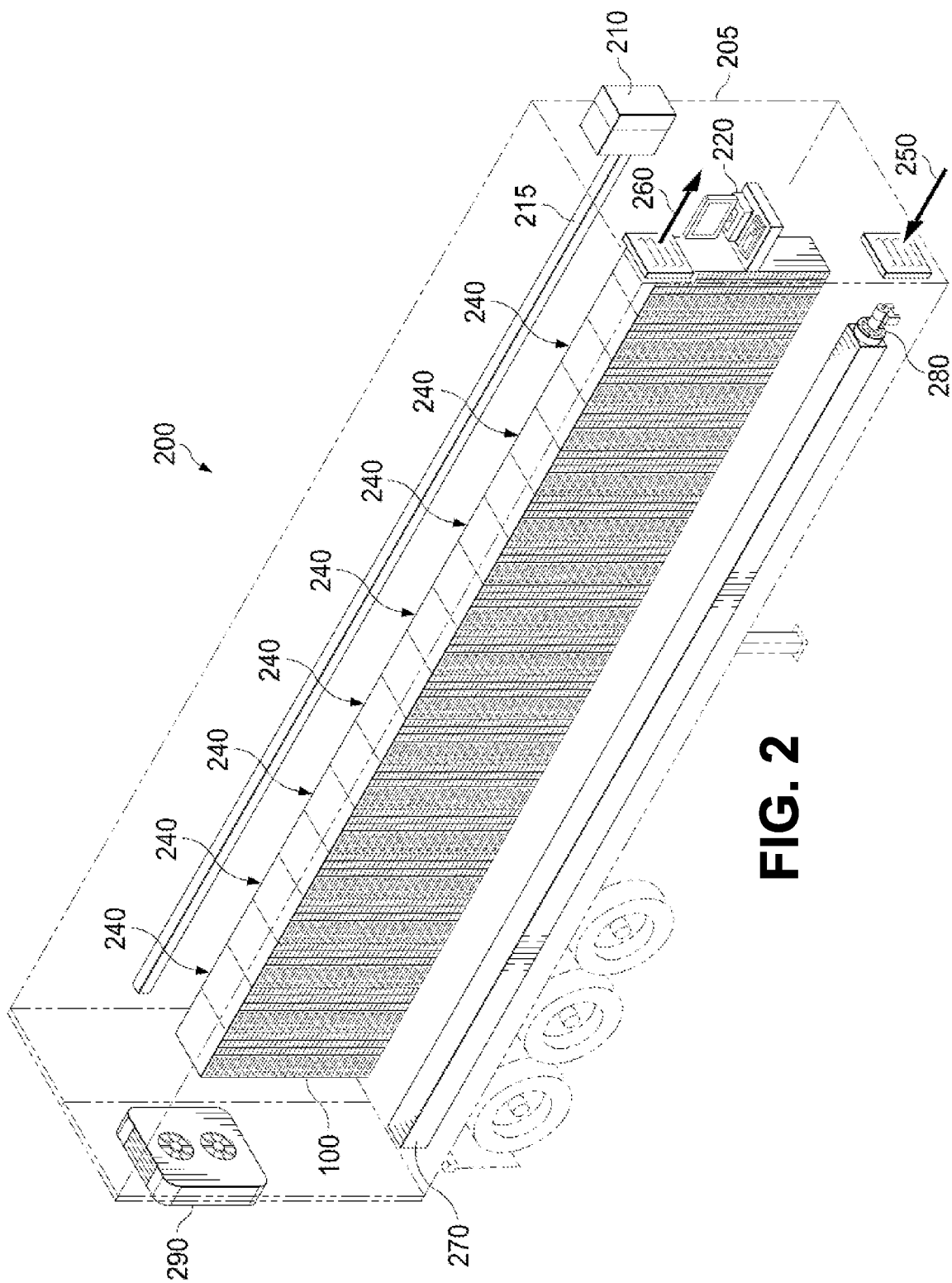
FIG. 2 shows a flexible datacenter in accordance with one or more embodiments of the present invention.

FIG. 2 shows a flexible datacenter 200 in accordance with one or more embodiments of the present invention. Flexible datacenter 200 may include a mobile container 205, a behind-the-meter power input system 210, a power distribution system 215, a climate control system (e.g., 250, 260, 270, 280, and/or 290), a datacenter control system 220, and a plurality of computing systems 100 disposed in one or more racks 240. Datacenter control system 220 may be a computing system (e.g., 100 of FIG. 1) configured to dynamically modulate power delivery to one or more computing systems 100 disposed within flexible datacenter 200 based on unutilized behind-the-meter power availability or an operational directive from a local station control system (not shown), a remote master control system (not shown), or a grid operator (not shown).

In certain embodiments, mobile container 205 may be a storage trailer disposed on wheels and configured for rapid deployment. In other embodiments, mobile container 205 may be a storage container (not shown) configured for placement on the ground and potentially stacked in a vertical or horizontal manner (not shown). In still other embodiments, mobile container 205 may be an inflatable container, a floating container, or any other type or kind of container suitable for housing a mobile datacenter 200. And in still other embodiments, flexible datacenter 200 might not include a mobile container. For example, flexible datacenter 200 may be situated within a building or another type of stationary environment.

Flexible datacenter 200 may be rapidly deployed on site near a source of unutilized behind-the-meter power generation. Behind-the-meter power input system 210 may be configured to input power to flexible datacenter 200. Behind-the-meter power input system 210 may include a first input (not independently illustrated) configured to receive three-phase behind-the-meter alternating current ("AC") voltage. In certain embodiments, behind-the-meter power input system 210 may include a supervisory AC-to-AC step-down transformer (not shown) configured to step down three-phase behind-the-meter AC voltage to single-phase supervisory nominal AC voltage or a second input (not independently illustrated) configured to receive single-phase supervisory nominal AC voltage from the local station (not shown) or a metered source (not shown). Behind-the-meter power input system 210 may provide single-phase supervisory nominal AC voltage to datacenter control system 220, which may remain powered at almost all times to control the operation of flexible datacenter 200. The first input (not independently illustrated) or a third input (not independently illustrated) of behind-the-meter power input system 210 may direct three-phase behind-the-meter AC voltage to an operational AC-to-AC step-down transformer (not shown) configured to controllably step down three-phase behind-the-meter AC voltage to three-phase nominal AC voltage. Datacenter control system 220 may controllably enable or disable generation or provision of three-phase nominal AC voltage by the operational AC-to-AC step-down transformer (not shown).

Behind-the-meter power input system 210 may provide three phases of three-phase nominal AC voltage to power distribution system 215. Power distribution system 215 may controllably provide a single phase of three-phase nominal AC voltage to each computing system 100 or group 240 of computing systems 100 disposed within flexible datacenter 200. Datacenter control system 220 may controllably select which phase of three-phase nominal AC voltage that power distribution system 215 provides to each computing system 100 or group 240 of computing systems 100. In this way, datacenter control system 220 may modulate power delivery by either ramping-up flexible datacenter 200 to fully operational status, ramping-down flexible datacenter 200 to offline status (where only datacenter control system 220 remains powered), reducing power consumption by withdrawing power delivery from, or reducing power to, one or more computing systems 100 or groups 240 of computing systems 100, or modulating a power factor correction factor for the local station by controllably adjusting which phases of three-phase nominal AC voltage are used by one or more computing systems 100 or groups 240 of computing systems 100. In some embodiments, flexible datacenter 200 may receive DC power to power computing systems 100.

Flexible datacenter 200 may include a climate control system (e.g., 250, 260, 270, 280, 290) configured to maintain the plurality of computing systems 100 within their operational temperature range. In certain embodiments, the climate control system may include an air intake 250, an evaporative cooling system 270, a fan 280, and an air outtake 260. In other embodiments, the climate control system may include an air intake 250, an air conditioner or refrigerant cooling system 290, and an air outtake 260. In still other embodiments, the climate control system may include a computer room air conditioner system (not shown), a computer room air handler system (not shown), or an immersive cooling system (not shown). One of ordinary skill in the art will recognize that any suitable heat extraction system (not shown) configured to maintain the operation of the plurality of computing systems 100 within their operational temperature range may be used in accordance with one or more embodiments of the present invention.

Flexible datacenter 200 may include a battery system (not shown) configured to convert three-phase nominal AC voltage to nominal DC voltage and store power in a plurality of storage cells. The battery system (not shown) may include a DC-to-AC inverter configured to convert nominal DC voltage to three-phase nominal AC voltage for flexible datacenter 200 use. Alternatively, the battery system (not shown) may include a DC-to-AC inverter configured to convert nominal DC voltage to single-phase nominal AC voltage to power datacenter control system 220.

One of ordinary skill in the art will recognize that a voltage level of three-phase behind-the-meter AC voltage may vary based on an application or design and the type or kind of local power generation. As such, a type, kind, or configuration of the operational AC-to-AC step down transformer (not shown) may vary based on the application or design. In addition, the frequency and voltage level of three-phase nominal AC voltage, single-phase nominal AC voltage, and nominal DC voltage may vary based on the application or design in accordance with one or more embodiments of the present invention.

Figure 3:
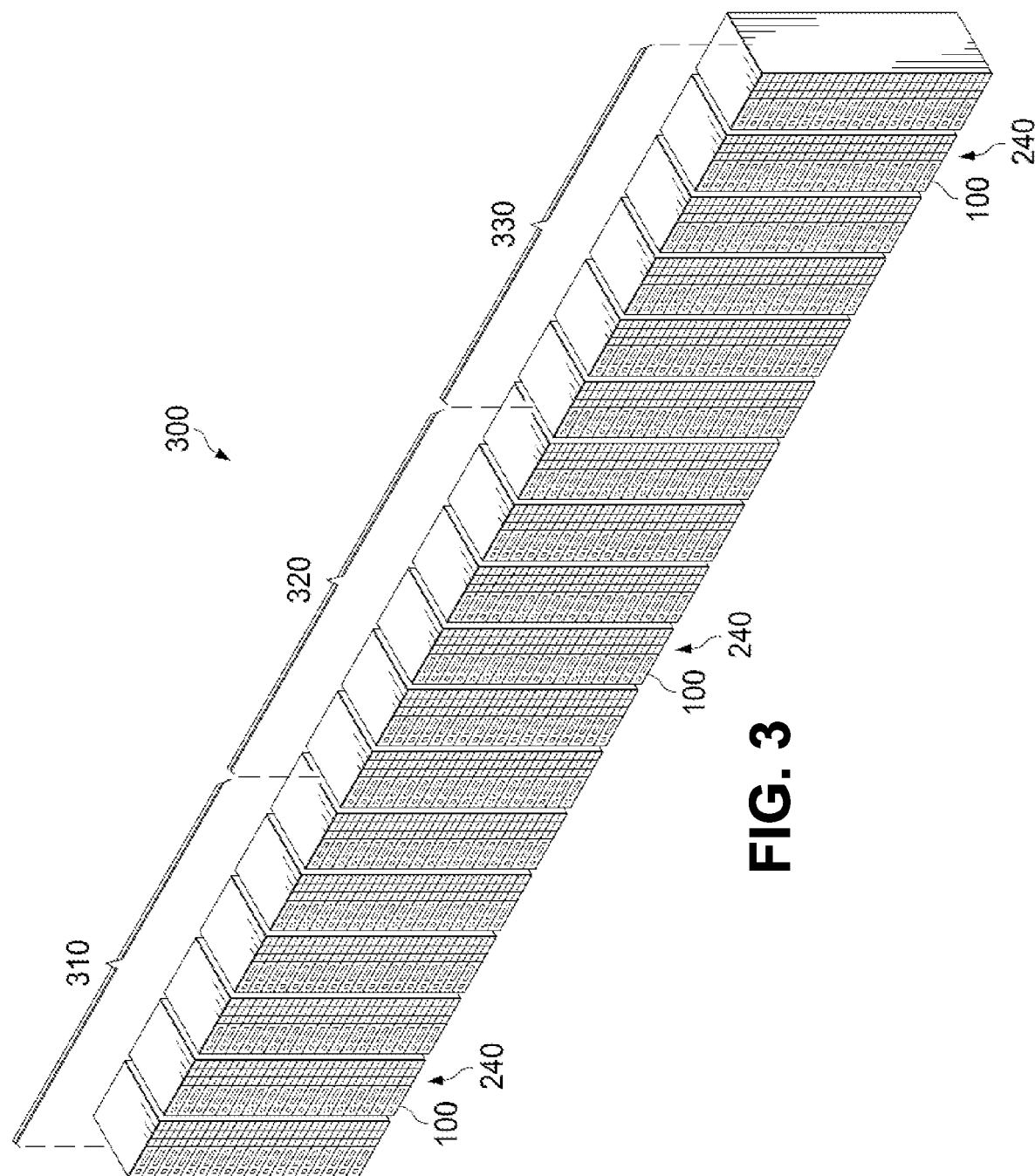
FIG. 3 shows a three-phase power distribution of a flexible datacenter in accordance with one or more embodiments of the present invention.

FIG. 3 shows a three-phase power distribution of a flexible datacenter 200 in accordance with one or more embodiments of the present invention. Flexible datacenter 200 may include a plurality of racks 240, each of which may include one or more computing systems 100 disposed therein. As discussed above, the behind-the-meter power input system (210 of FIG. 2) may provide three phases of three-phase nominal AC voltage to the power distribution system (215 of FIG. 2). The power distribution system (215 of FIG. 2) may controllably provide a single phase of three-phase nominal AC voltage to each computing system 100 or group 240 of computing systems 100 disposed within flexible datacenter 200. For example, a flexible datacenter 200 may include eighteen racks 240, each of which may include eighteen computing systems 100. The power distribution system (215 of FIG. 2) may control which phase of three-phase nominal AC voltage is provided to one or more computing systems 100, a rack 240 of computing systems 100, or a group (e.g., 310, 320, or 330) of racks 240 of computing systems 100.

In the figure, for purposes of illustration only, eighteen racks 240 are divided into a first group of six racks 310, a second group of six racks 320, and a third group of six racks 330, where each rack contains eighteen computing systems 100. The power distribution system (215 of FIG. 2) may, for example, provide a first phase of three-phase nominal AC voltage to the first group of six racks 310, a second phase of three-phase nominal AC voltage to the second group of six racks 320, and a third phase of three-phase nominal AC voltage to the third group of six racks 330. If the flexible datacenter (200 of FIG. 2) receives an operational directive from the local station (not shown) to provide power factor correction, the datacenter control system (220 of FIG. 2) may direct the power distribution system (215 of FIG. 2) to adjust which phase or phases of three-phase nominal AC voltage are used to provide the power factor correction required by the local station (not shown) or grid operator (not shown). One of ordinary skill in the art will recognize that, in addition to the power distribution, the load may be varied by adjusting the number of computing systems 100 operatively powered. As such, the flexible datacenter (200 of FIG. 2) may be configured to act as a capacitive or inductive load to provide the appropriate reactance necessary to achieve the power factor correction required by the local station (not shown).

Figure 4:
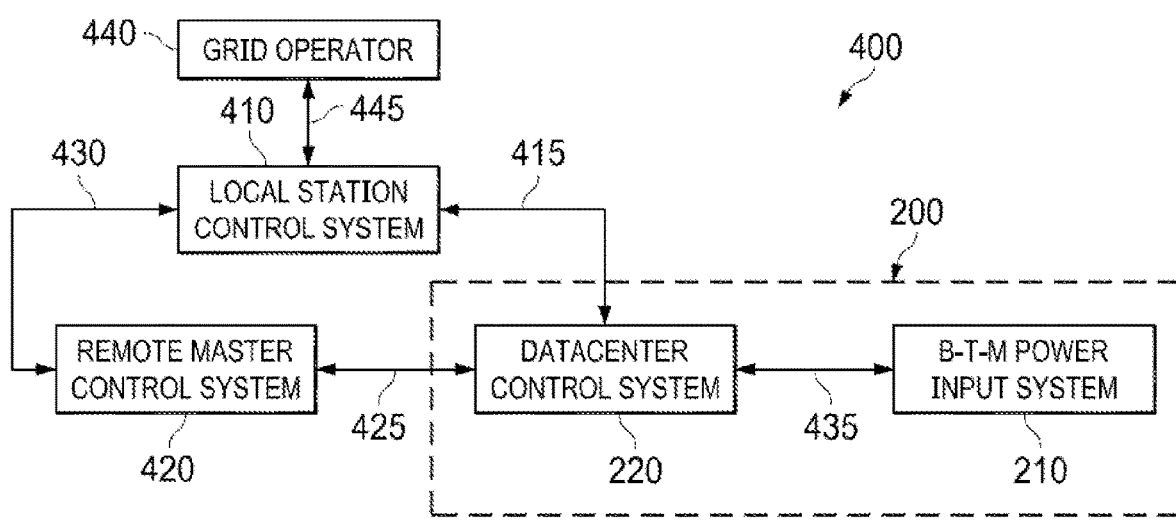
FIG. 4 shows a control distribution scheme of a flexible datacenter in accordance with one or more embodiments of the present invention.

FIG. 4 shows a control distribution scheme 400 of a flexible datacenter 200 in accordance with one or more embodiments of the present invention. Datacenter control system 220 may independently, or cooperatively with one or more of local station control system 410, remote master control system 420, and grid operator 440, modulate power delivery to flexible datacenter 200. Specifically, power delivery may be dynamically adjusted based on conditions or operational directives.

Local station control system 410 may be a computing system (e.g., 100 of FIG. 1) that is configured to control various aspects of the local station (not independently illustrated) that generates power and sometimes generates unutilized behind-the-meter power. Local station control system 410 may communicate with remote master control system 420 over a networked connection 430 and with datacenter control system 220 over a networked or hardwired connection 415. Remote master control system 420 may be a computing system (e.g., 100 of FIG. 1) that is located offsite, but connected via a network connection 425 to datacenter control system 220, that is configured to provide supervisory or override control of flexible datacenter 200 or a fleet (not shown) of flexible datacenters 200. Grid operator 440 may be a computing system (e.g., 100 of FIG. 1) that is configured to control various aspects of the grid (not independently illustrated) that receives power from the local station (not independently illustrated). Grid operator 440 may communicate with local station control system 440 over a networked or hardwired connection 445.

Datacenter control system 220 may monitor unutilized behind-the-meter power availability at the local station (not independently illustrated) and determine when a datacenter ramp-up condition is met. Unutilized behind-the-meter power availability may include one or more of excess local power generation, excess local power generation that the grid cannot accept, local power generation that is subject to economic curtailment, local power generation that is subject to reliability curtailment, local power generation that is subject to power factor correction, conditions where the cost for power is economically viable (e.g., low cost for power), situations where local power generation is prohibitively low, start up situations, transient situations, or testing situations where there is an economic advantage to using locally generated behind-the-meter power generation, specifically power available at little to no cost and with no associated transmission or distribution losses or costs.

The datacenter ramp-up condition may be met if there is sufficient behind-the-meter power availability and there is no operational directive from local station control system 410, remote master control system 420, or grid operator 440 to go offline or reduce power. As such, datacenter control system 220 may enable 435 behind-the-meter power input system 210 to provide three-phase nominal AC voltage to the power distribution system (215 of FIG. 2) to power the plurality of computing systems (100 of FIG. 2) or a subset thereof. Datacenter control system 220 may optionally direct one or more computing systems (100 of FIG. 2) to perform predetermined computational operations. For example, if the one or more computing systems (100 of FIG. 2) are configured to perform blockchain hashing operations, datacenter control system 220 may direct them to perform blockchain hashing operations for a specific blockchain application, such as, for example, Bitcoin, Litecoin, or Ethereum. Alternatively, one or more computing systems (100 of FIG. 2) may be configured to independently receive a computational directive from a network connection (not shown) to a peer-to-peer blockchain network (not shown) such as, for example, a network for a specific blockchain application, to perform predetermined computational operations.

Remote master control system 420 may specify to datacenter control system 220 what sufficient behind-the-meter power availability constitutes, or datacenter control system 220 may be programmed with a predetermined preference or criteria on which to make the determination independently. For example, in certain circumstances, sufficient behind-the-meter power availability may be less than that required to fully power the entire flexible datacenter 200. In such circumstances, datacenter control system 220 may provide power to only a subset of computing systems (100 of FIG. 2), or operate the plurality of computing systems (100 of FIG. 2) in a lower power mode, that is within the sufficient, but less than full, range of power that is available.

While flexible datacenter 200 is online and operational, a datacenter ramp-down condition may be met when there is insufficient, or anticipated to be insufficient, behind-the-meter power availability or there is an operational directive from local station control system 410, remote master control system 420, or grid operator 440. Datacenter control system 220 may monitor and determine when there is insufficient, or anticipated to be insufficient, behind-the-meter power availability. As noted above, sufficiency may be specified by remote master control system 420 or datacenter control system 220 may be programmed with a predetermined preference or criteria on which to make the determination independently. An operational directive may be based on current dispatchability, forward looking forecasts for when unutilized behind-the-meter power is, or is expected to be, available, economic considerations, reliability considerations, operational considerations, or the discretion of the local station 410, remote master control 420, or grid operator 440. For example, local station control system 410, remote master control system 420, or grid operator 440 may issue an operational directive to flexible datacenter 200 to go offline and power down. When the datacenter ramp-down condition is met, datacenter control system 220 may disable power delivery to the plurality of computing systems (100 of FIG. 2). Datacenter control system 220 may disable 435 behind-the-meter power input system 210 from providing three-phase nominal AC voltage to the power distribution system (215 of FIG. 2) to power down the plurality of computing systems (100 of FIG. 2), while datacenter control system 220 remains powered and is capable of rebooting flexible datacenter 200 when unutilized behind-the-meter power becomes available again.

While flexible datacenter 200 is online and operational, changed conditions or an operational directive may cause datacenter control system 220 to modulate power consumption by flexible datacenter 200. Datacenter control system 220 may determine, or local station control system 410, remote master control system 420, or grid operator 440 may communicate, that a change in local conditions may result in less power generation, availability, or economic feasibility, than would be necessary to fully power flexible datacenter 200. In such situations, datacenter control system 220 may take steps to reduce or stop power consumption by flexible datacenter 200 (other than that required to maintain operation of datacenter control system 220). Alternatively, local station control system 410, remote master control system 420, or grid operator 440, may issue an operational directive to reduce power consumption for any reason, the cause of which may be unknown. In response, datacenter control system 220 may dynamically reduce or withdraw power delivery to one or more computing systems (100 of FIG. 2) to meet the dictate. Datacenter control system 220 may controllably provide three-phase nominal AC voltage to a smaller subset of computing systems (100 of FIG. 2) to reduce power consumption. Datacenter control system 220 may dynamically reduce the power consumption of one or more computing systems (100 of FIG. 2) by reducing their operating frequency or forcing them into a lower power mode through a network directive.

One of ordinary skill in the art will recognize that datacenter control system 220 may be configured to have a number of different configurations, such as a number or type or kind of computing systems (100 of FIG. 2) that may be powered, and in what operating mode, that correspond to a number of different ranges of sufficient and available unutilized behind-the-meter power availability. As such, datacenter control system 220 may modulate power delivery over a variety of ranges of sufficient and available unutilized behind-the-meter power availability.

Figure 5:
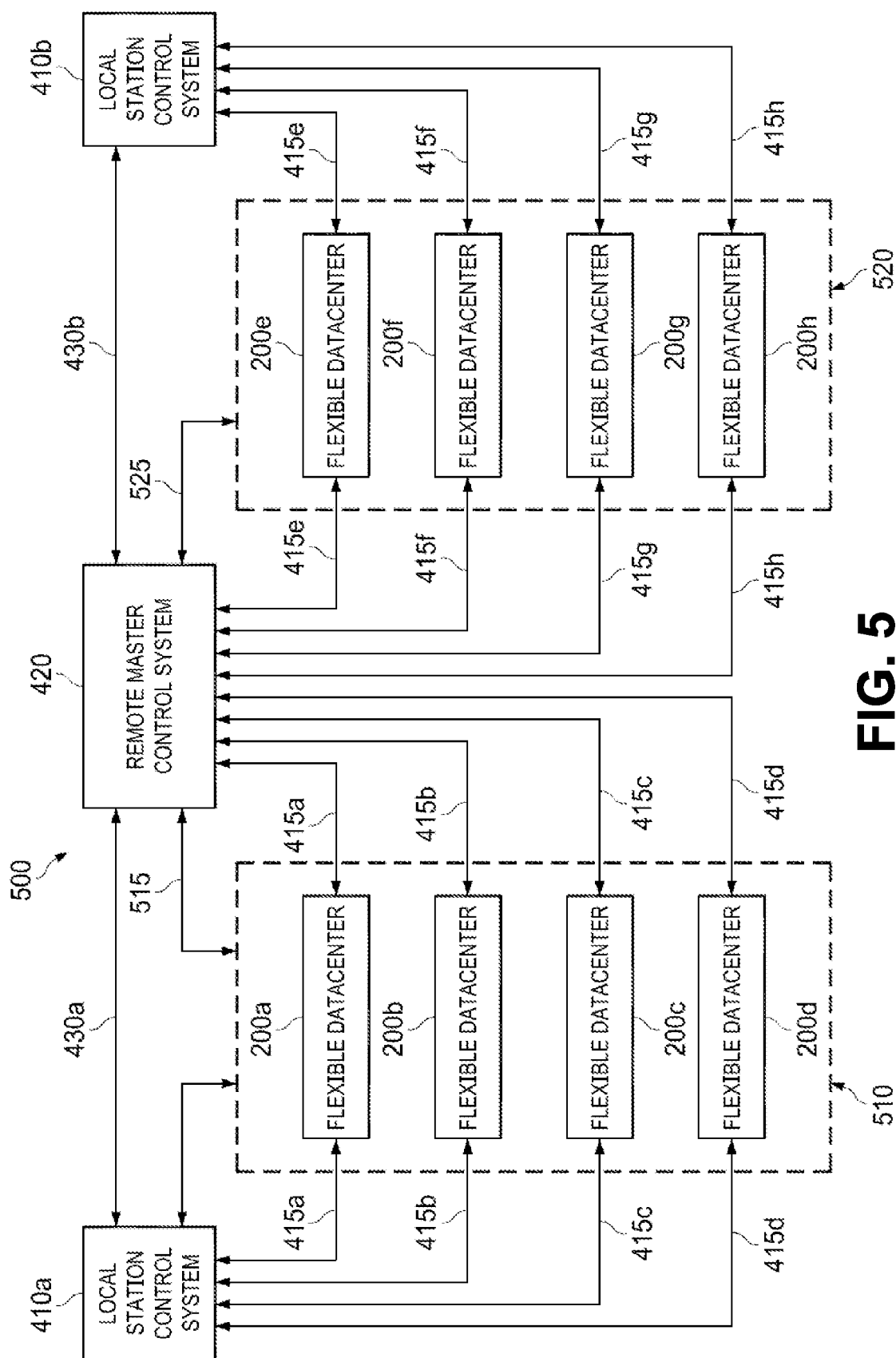
FIG. 5 shows a control distribution scheme of a fleet of flexible datacenters in accordance with one or more embodiments of the present invention.

FIG. 5 shows a control distribution of a fleet 500 of flexible datacenters 200 in accordance with one or more embodiments of the present invention. The control distribution of a flexible datacenter 200 shown and described with respect to FIG. 4 may be extended to a fleet 500 of flexible datacenters 200. For example, a first local station (not independently illustrated), such as, for example, a wind farm (not shown), may include a first plurality 510 of flexible datacenters 200a through 200d, which may be collocated or distributed across the local station (not shown). A second local station (not independently illustrated), such as, for example, another wind farm or a solar farm (not shown), may include a second plurality 520 of flexible datacenters 200e through 200h, which may be collocated or distributed across the local station (not shown). One of ordinary skill in the art will recognize that the number of flexible datacenters 200 deployed at a given station and the number of stations within the fleet may vary based on an application or design in accordance with one or more embodiments of the present invention.

Remote master control system 420 may provide supervisory control over fleet 500 of flexible datacenters 200 in a similar manner to that shown and described with respect to FIG. 4, with the added flexibility to make high level decisions with respect to fleet 500 that may be counterintuitive to a given station. Remote master control system 420 may make decisions regarding the issuance of operational directives to a given local station based on, for example, the status of each local station where flexible datacenters 200 are deployed, the workload distributed across fleet 500, and the expected computational demand required for the expected workload. In addition, remote master control system 420 may shift workloads from a first plurality 510 of flexible datacenters 200 to a second plurality 520 of flexible datacenters 200 for any reason, including, for example, a loss of unutilized behind-the-meter power availability at one local station and the availability of unutilized behind-the-meter power at another local station.

Figure 6:
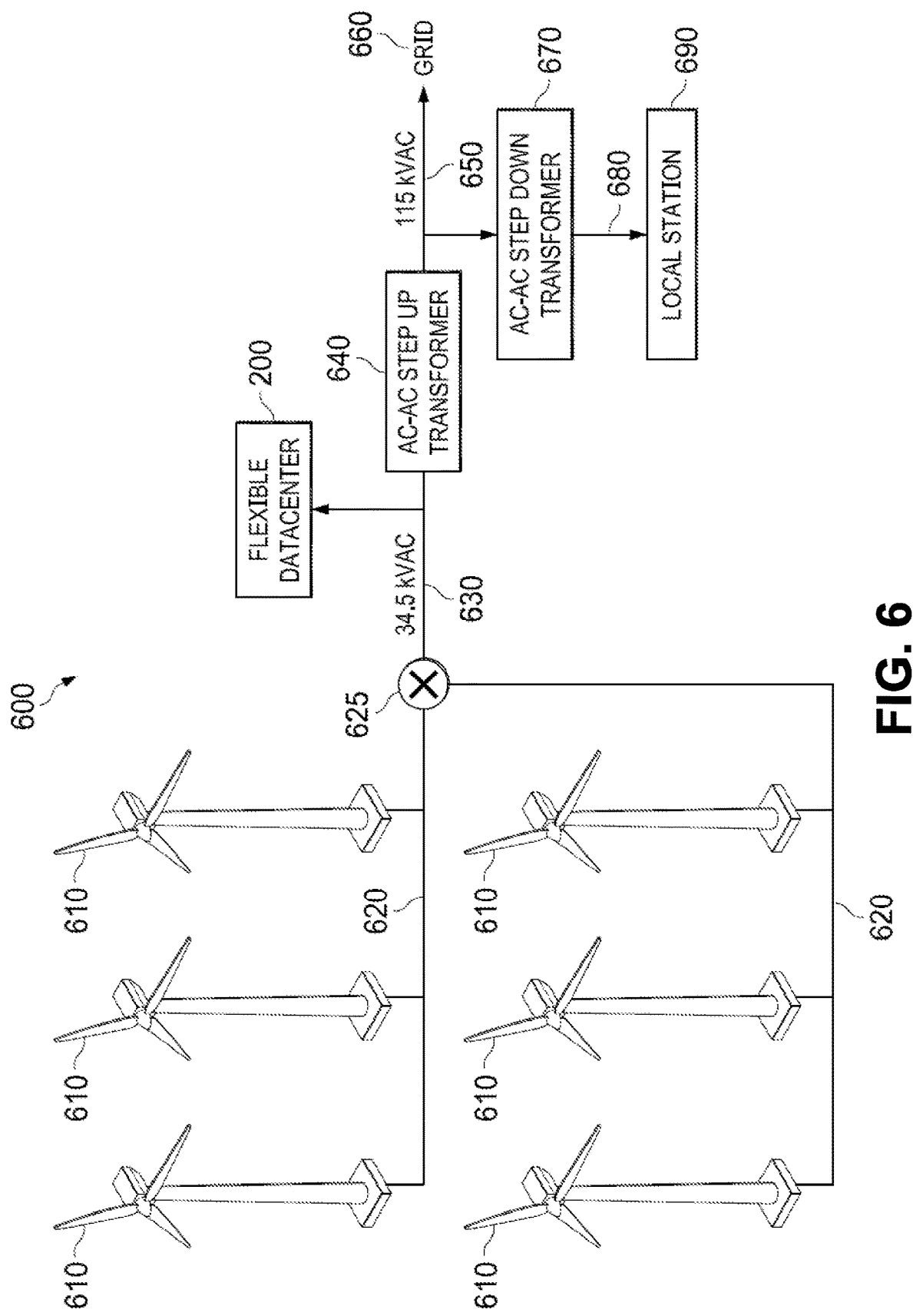
FIG. 6 shows a flexible datacenter powered by one or more wind turbines in accordance with one or more embodiments of the present invention.

FIG. 6 shows a flexible datacenter 200 powered by one or more wind turbines 610 in accordance with one or more embodiments of the present invention. A wind farm 600 typically includes a plurality of wind turbines 610, each of which intermittently generates a wind-generated AC voltage. The wind-generated AC voltage may vary based on a type, kind, or configuration of farm 600, turbine 610, and incident wind speed. The wind-generated AC voltage is typically input into a turbine AC-to-AC step-up transformer (not shown) that is disposed within the nacelle (not independently illustrated) or at the base of the mast (not independently illustrated) of turbine 610. The turbine AC-to-AC step up transformer (not shown) outputs three-phase wind-generated AC voltage 620. Three-phase wind-generated AC voltage 620 produced by the plurality of wind turbines 610 is collected 625 and provided 630 to another AC-to-AC step-up transformer 640 that steps up three-phase wind-generated AC voltage 620 to three-phase grid AC voltage 650 suitable for delivery to grid 660. Three-phase grid AC voltage 650 may be stepped down with an AC-to-AC step-down transformer 670 configured to produce three-phase local station AC voltage 680 provided to local station 690. One of ordinary skill in the art will recognize that the actual voltage levels may vary based on the type, kind, or number of wind turbines 610, the configuration or design of wind farm 600, and grid 660 that it feeds into.

The output side of AC-to-AC step-up transformer 640 that connects to grid 660 may be metered and is typically subject to transmission and distribution costs. In contrast, power consumed on the input side of AC-to-AC step-up transformer 640 may be considered "behind-the-meter" and is typically not subject to transmission and distribution costs. As such, one or more flexible datacenters 200 may be powered by three-phase wind-generated AC voltage 620. Specifically, in wind farm 600 applications, the three-phase behind-the-meter AC voltage used to power flexible datacenter 200 may be three-phase wind-generated AC voltage 620. As such, flexible datacenter 200 may reside behind-the-meter, avoid transmission and distribution costs, and may be dynamically powered when unutilized behind-the-meter power is available.

Unutilized behind-the-meter power availability may occur when there is excess local power generation. In high wind conditions, wind farm 600 may generate more power than, for example, AC-to-AC step-up transformer 640 is rated for. In such situations, wind farm 600 may have to take steps to protect its equipment from damage, which may include taking one or more turbines 610 offline or shunting their voltage to dummy loads or ground. Advantageously, one or more flexible datacenters 200 may be used to consume power on the input side of AC-to-AC step-up transformer 640, thereby allowing wind farm 600 to operate equipment within operating ranges while flexible datacenter 200 receives behind-the-meter power without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 660 cannot, for whatever reason, take the power being produced by wind farm 600. In such situations, wind farm 600 may have to take one or more turbines 610 offline or shunt their voltage to dummy loads or ground. Advantageously, one or more flexible datacenters 200 may be used to consume power on the input side of AC-to-AC step-up transformer 640, thereby allowing wind farm 600 to either produce power to grid 660 at a lower level or shut down transformer 640 entirely while flexible datacenter 200 receives behind-the-meter power without transmission or distribution costs. The local station control system (not independently illustrated) of local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price that is offset by a production tax credit. In certain circumstances, the value of the production tax credit may exceed the price wind farm 600 would have to pay to grid 660 to offload their generated power. Advantageously, one or more flexible datacenters 200 may be used to consume power behind-the-meter, thereby allowing wind farm 600 to produce and obtain the production tax credit, but sell less power to grid 660 at the negative price. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenter 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is selling power to grid 660 at a negative price because grid 660 is oversupplied or is instructed to stand down and stop producing altogether. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but making productive use of the power generated behind-the-meter without transmission or distribution costs. The local station control system (not independently illustrated) of the local station 690 or the grid operator (not independently illustrated) of grid 660 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when wind farm 600 is producing power to grid 660 that is unstable, out of phase, or at the wrong frequency, or grid 660 is already unstable, out of phase, or at the wrong frequency for whatever reason. The grid operator (not independently illustrated) may select certain power generation stations to go offline and stop producing power to grid 660. Advantageously, one or more flexible datacenters 200 may be used to consume power behind-the-meter, thereby allowing wind farm 600 to stop producing power to grid 660, but make productive use of the power generated behind-the-meter without transmission or distribution costs. The local station control system (not independently illustrated) of local station 690 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when wind farm 600 experiences low wind conditions that make it not economically feasible to power up certain components, such as, for example, the local station (not independently illustrated), but there may be sufficient behind-the-meter power availability to power one or more flexible datacenters 200. Similarly, unutilized behind-the-meter power availability may occur when wind farm 600 is starting up, or testing, one or more turbines 610. Turbines 610 are frequently offline for installation, maintenance, and service and must be tested prior to coming online as part of the array. One or more flexible datacenters 200 may be powered by one or more turbines 610 that are offline from farm 600. The above-noted examples of when unutilized behind-the-meter power is available are merely exemplary and are not intended to limit the scope of what one of ordinary skill in the art would recognize as unutilized behind-the-meter power availability. Unutilized behind-the-meter power availability may occur anytime there is power available and accessible behind-the-meter that is not subject to transmission and distribution costs and there is an economic advantage to using it.

One of ordinary skill in the art will recognize that wind farm 600 and wind turbine 610 may vary based on an application or design in accordance with one or more embodiments of the present invention.

Figure 7:
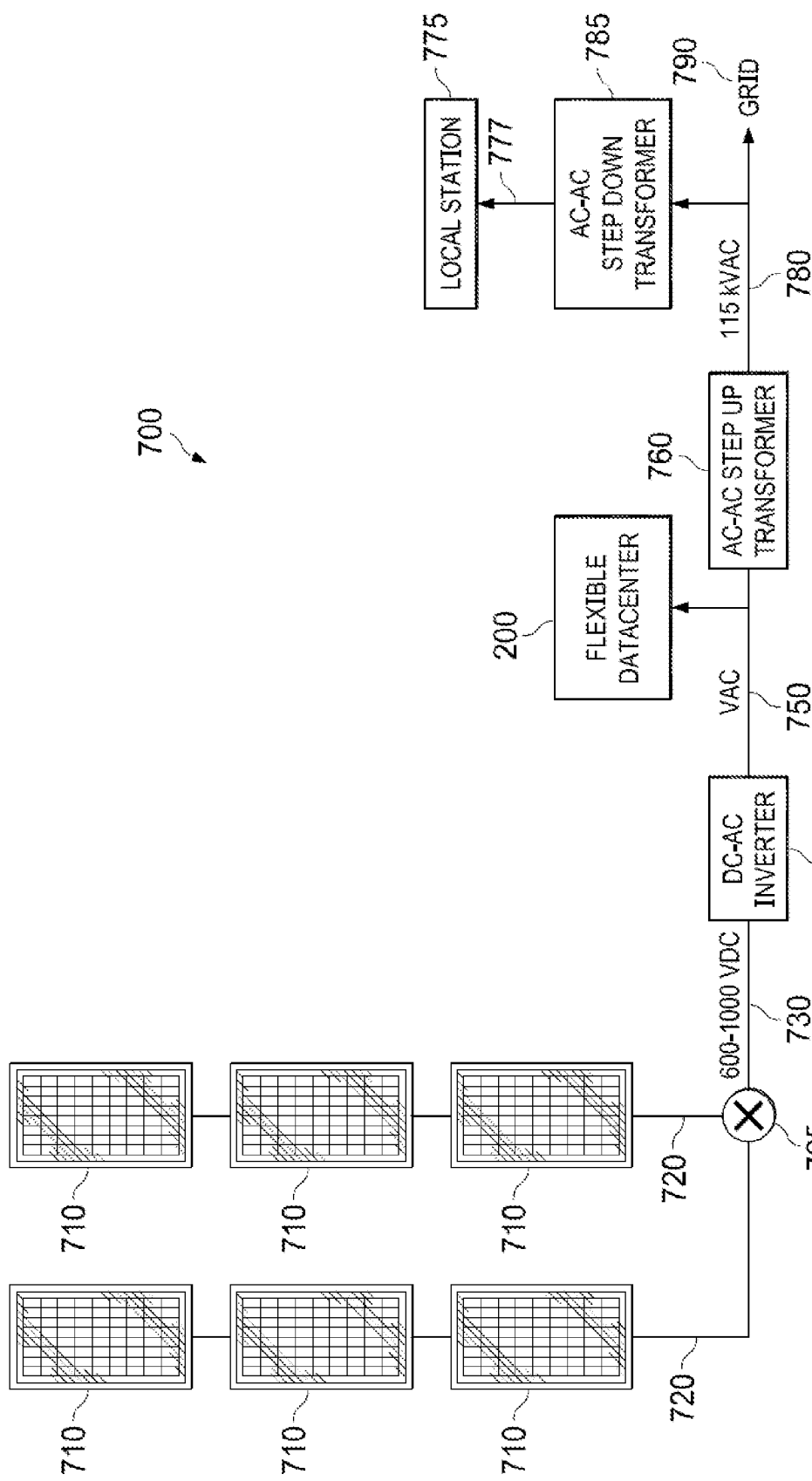
FIG. 7 shows a flexible datacenter powered by one or more solar panels in accordance with one or more embodiments of the present invention.

FIG. 7 shows a flexible datacenter 200 powered by one or more solar panels 710 in accordance with one or more embodiments of the present invention. A solar farm 700 typically includes a plurality of solar panels 710, each of which intermittently generates a solar-generated DC voltage 720. Solar-generated DC voltage 720 may vary based on a type, kind, or configuration of farm 700, panel 710, and incident sunlight. Solar-generated DC voltage 720 produced by the plurality of solar panels 710 is collected 725 and provided 730 to a DC-to-AC inverter 740 that converts solar-generated DC voltage into three-phase solar-generated AC voltage 750. Three-phase solar-generated AC voltage 750 is provided to an AC-to-AC step-up transformer 760 that steps up three-phase solar-generated AC voltage to three-phase grid AC voltage 790. Three-phase grid AC voltage 790 may be stepped down with an AC-to-AC step-down transformer 785 configured to produce three-phase local station AC voltage 777 provided to local station 775. One of ordinary skill in the art will recognize that the actual voltage levels may vary based on the type, kind, or number of solar panels 710, the configuration or design of solar farm 700, and grid 790 that it feeds into.

The output side of AC-to-AC step-up transformer 760 that connects to grid 790 may be metered and is typically subject to transmission and distribution costs. In contrast, power consumed on the input side of AC-to-AC step-up transformer 760 may be considered behind-the-meter and is typically not subject to transmission and distribution costs. As such, one or more flexible datacenters 200 may be powered by three-phase solar-generated AC voltage 750. Specifically, in solar farm 700 applications, the three-phase behind-the-meter AC voltage used to power flexible datacenter 200 may be three-phase solar-generated AC voltage 750. As such, flexible datacenter 200 may reside behind-the-meter, avoid transmission and distribution costs, and may be dynamically powered when unutilized behind-the-meter power is available. In some embodiments, the solar farm 700 may provide DC power directly to flexible datacenter 200 without a conversion to AC via the DC-to-AC inverter 740.

Unutilized behind-the-meter power availability may occur when there is excess local power generation. In high incident sunlight situations, solar farm 700 may generate more power than, for example, AC-to-AC step-up transformer 760 is rated for. In such situations, solar farm 700 may have to take steps to protect its equipment from damage, which may include taking one or more panels 710 offline or shunting their voltage to dummy loads or ground. Advantageously, one or more flexible datacenters 200 may be used to consume power on the input side of AC-to-AC step-up transformer 760, thereby allowing solar farm 700 to operate equipment within operating ranges while flexible datacenter 200 receives behind-the-meter power without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote mater control system (420 of FIG. 4) may determine how to power each individual flexible datacenter 200 in accordance with the operational directive or provide an override to each flexible datacenter 200.

Another example of unutilized behind-the-meter power availability is when grid 790 cannot, for whatever reason, take the power being produced by solar farm 700. In such situations, solar farm 700 may have to take one or more panels 710 offline or shunt their voltage to dummy loads or ground. Advantageously, one or more flexible datacenters 200 may be used to consume power on the input side of AC-to-AC step-up transformer 760, thereby allowing solar farm 700 to either produce power to grid 790 at a lower level or shut down transformer 760 entirely while flexible datacenter 200 receives behind-the-meter power without transmission or distribution costs. The local station control system (not independently illustrated) of local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price that is offset by a production tax credit. In certain circumstances, the value of the production tax credit may exceed the price solar farm 700 would have to pay to grid 790 to offload their generated power. Advantageously, one or more flexible datacenters 200 may be used to consume power behind-the-meter, thereby allowing solar farm 700 to produce and obtain the production tax credit, but sell less power to grid 790 at the negative price. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is selling power to grid 790 at a negative price because grid 790 is oversupplied or is instructed to stand down and stop producing altogether. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but making productive use of the power generated behind-the-meter without transmission or distribution costs. The local station control system (not independently illustrated) of the local station 775 or the grid operator (not independently illustrated) of grid 790 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Another example of unutilized behind-the-meter power availability is when solar farm 700 is producing power to grid 790 that is unstable, out of phase, or at the wrong frequency, or grid 790 is already unstable, out of phase, or at the wrong frequency for whatever reason. The grid operator (not independently illustrated) may select certain power generation stations to go offline and stop producing power to grid 790. Advantageously, one or more flexible datacenters 200 may be used to consume power behind-the-meter, thereby allowing solar farm 700 to stop producing power to grid 790, but make productive use of the power generated behind-the-meter without transmission or distribution costs. The local station control system (not independently illustrated) of local station 775 may issue an operational directive to the one or more flexible datacenters 200 or to the remote master control system (420 of FIG. 4) to ramp-up to the desired power consumption level. When the operational directive requires the cooperative action of multiple flexible datacenters 200, the remote master control system (420 of FIG. 4) may determine how to power each individual flexible datacenter 200 in accordance with the operational directive or provide an override to each flexible datacenter 200.

Further examples of unutilized behind-the-meter power availability is when solar farm 700 experiences intermittent cloud cover such that it is not economically feasible to power up certain components, such as, for example local station 775, but there may be sufficient behind-the-meter power availability to power one or more flexible datacenters 200. Similarly, unutilized behind-the-meter power availability may occur when solar farm 700 is starting up, or testing, one or more panels 710. Panels 710 are frequently offline for installation, maintenance, and service and must be tested prior to coming online as part of the array. One or more flexible datacenters 200 may be powered by one or more panels 710 that are offline from farm 700. The above-noted examples of when unutilized behind-the-meter power is available are merely exemplary and are not intended to limit the scope of what one of ordinary skill in the art would recognize as unutilized behind-the-meter power availability. Behind-the-meter power availability may occur anytime there is power available and accessible behind-the-meter that is not subject to transmission and distribution costs and there is an economic advantage to using it.

One of ordinary skill in the art will recognize that solar farm 700 and solar panel 710 may vary based on an application or design in accordance with one or more embodiments of the present invention.

Figure 8:
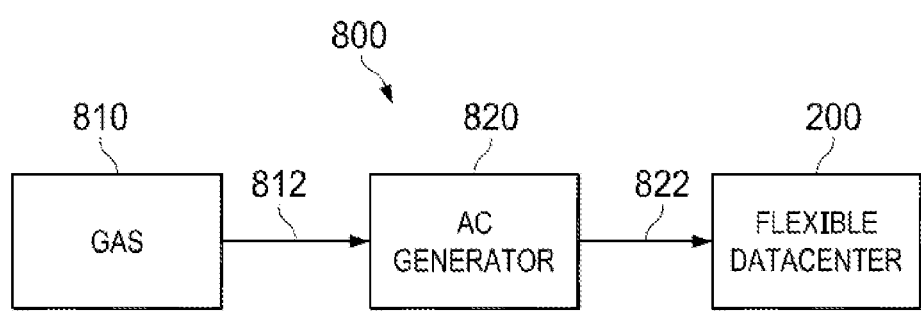
FIG. 8 shows a flexible datacenter powered by flare gas in accordance with one or more embodiments of the present invention.

FIG. 8 shows a flexible datacenter 200 powered by flare gas 800 in accordance with one or more embodiments of the present invention. Flare gas 800 is combustible gas produced as a product or by-product of petroleum refineries, chemical plants, natural gas processing plants, oil and gas drilling rigs, and oil and gas production facilities. Flare gas 800 is typically burned off through a flare stack (not shown) or vented into the air. In one or more embodiments of the present invention, flare gas 800 may be diverted 812 to a gas-powered generator that produces three-phase gas-generated AC voltage 822. This power may be considered behind-the-meter and is not subject to transmission and distribution costs. As such, one or more flexible datacenters 200 may be powered by three-phase gas-generated AC voltage. Specifically, the three-phase behind-the-meter AC voltage used to power flexible datacenter 200 may be three-phase gas-generated AC voltage 822. Accordingly, flexible datacenter 200 may reside behind-the-meter, avoid transmission and distribution costs, and may be dynamically powered when unutilized behind-the-meter power is available.

Figure 9A:
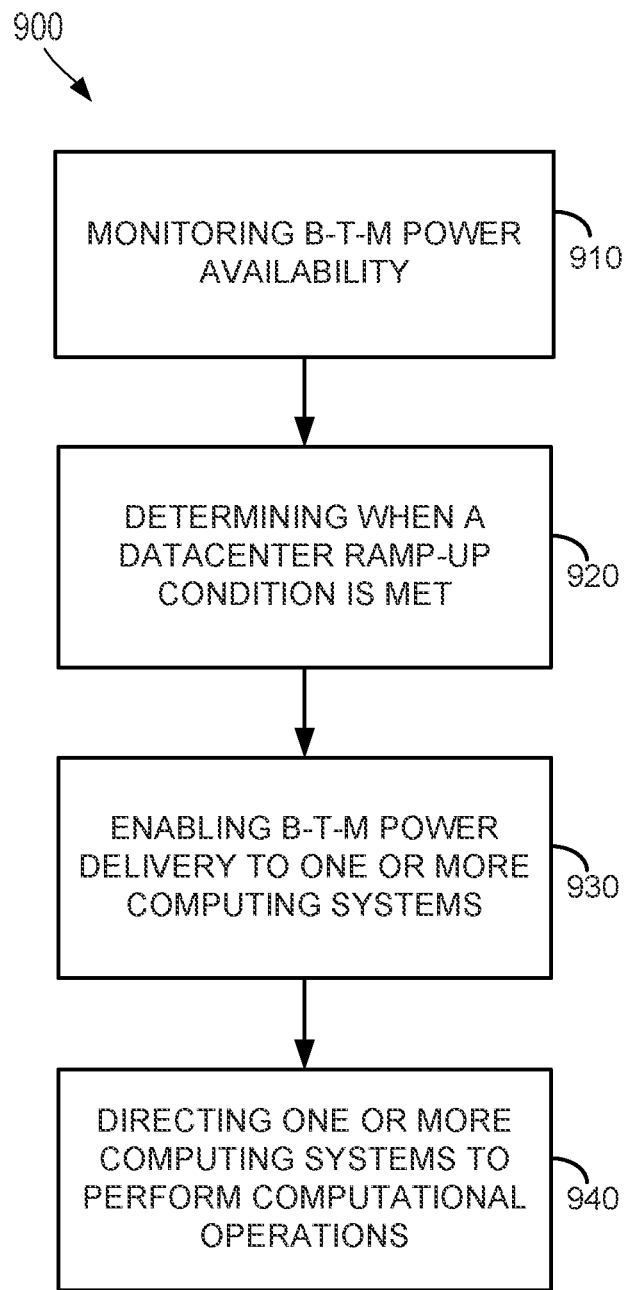
FIG. 9A shows a method of dynamic power delivery to a flexible datacenter using behind-the-meter power in accordance with one or more embodiments of the present invention.

FIG. 9A shows a method of dynamic power delivery to a flexible datacenter (200 of FIG. 2) using behind-the-meter power 900 in accordance with one or more embodiments of the present invention. In step 910, the datacenter control system (220 of FIG. 4), or the remote master control system (420 of FIG. 4), may monitor behind-the-meter power availability. In certain embodiments, monitoring may include receiving information or an operational directive from the local station control system (410 of FIG. 4) or the grid operator (440 of FIG. 4) corresponding to behind-the-meter power availability.

In step 920, the datacenter control system (220 of FIG. 4), or the remote master control system (420 of FIG. 4), may determine when a datacenter ramp-up condition is met. In certain embodiments, the datacenter ramp-up condition may be met when there is sufficient behind-the-meter power availability and there is no operational directive from the local station to go offline or reduce power. In step 930, the datacenter control system (220 of FIG. 4) may enable behind-the-meter power delivery to one or more computing systems (100 of FIG. 2). In step 940, once ramped-up, the datacenter control system (220 of FIG. 4) or the remote master control system (420 of FIG. 4) may direct one or more computing systems (100 of FIG. 2) to perform predetermined computational operations. In certain embodiments, the predetermined computational operations may include the execution of one or more hashing functions.

While operational, the datacenter control system (220 of FIG. 4), or the remote master control system (420 of FIG. 4), may receive an operational directive to modulate power consumption. In certain embodiments, the operational directive may be a directive to reduce power consumption. In such embodiments, the datacenter control system (220 of FIG. 4) or the remote master control system (420 of FIG. 4) may dynamically reduce power delivery to one or more computing systems (100 of FIG. 2) or dynamically reduce power consumption of one or more computing systems. In other embodiments, the operational directive may be a directive to provide a power factor correction factor. In such embodiments, the datacenter control system (220 of FIG. 4) or the remote master control system (420 of FIG. 4) may dynamically adjust power delivery to one or more computing systems (100 of FIG. 2) to achieve a desired power factor correction factor. In still other embodiments, the operational directive may be a directive to go offline or power down. In such embodiments, the datacenter control system (220 of FIG. 4) may disable power delivery to one or more computing systems (100 of FIG. 2).

Figure 9B:
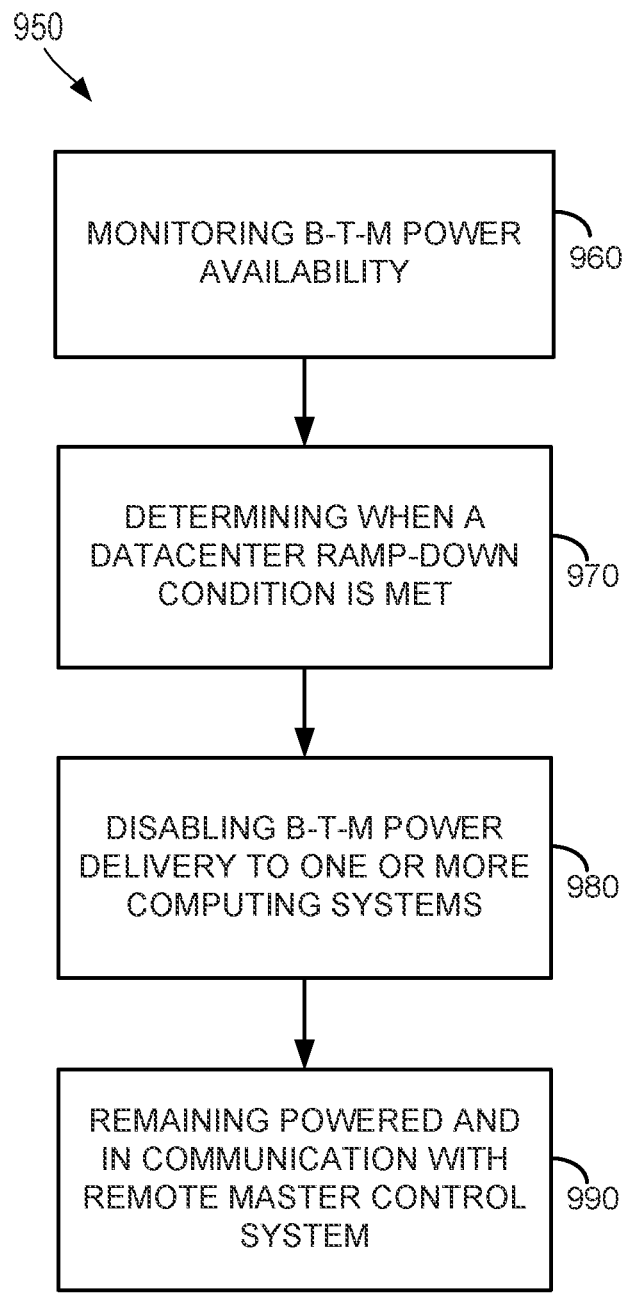
FIG. 9B shows another method of dynamic power delivery to a flexible datacenter using behind-the-meter power in accordance with one or more embodiments of the present invention.

As such, FIG. 9B shows a method of dynamic power delivery to a flexible datacenter (200 of FIG. 2) using behind-the-meter power 950 in accordance with one or more embodiments of the present invention. In step 960, the datacenter control system (220 of FIG. 4), or the remote master control system (420 of FIG. 4), may monitor behind-the-meter power availability. In certain embodiments, monitoring may include receiving information or an operational directive from the local station control system (410 of FIG. 4) or the grid operator (440 of FIG. 4) corresponding to behind-the-meter power availability.

In step 970, the datacenter control system (220 of FIG. 4), or the remote master control system (420 of FIG. 4), may determine when a datacenter ramp-down condition is met. In certain embodiments, the datacenter ramp-down condition may be met when there is insufficient behind-the-meter power availability or anticipated to be insufficient behind-the-meter power availability or there is an operational directive from the local station to go offline or reduce power. In step 980, the datacenter control system (220 of FIG. 4) may disable behind-the-meter power delivery to one or more computing systems (100 of FIG. 2). In step 990, once ramped-down, the datacenter control system (220 of FIG. 4) remains powered and in communication with the remote master control system (420 of FIG. 4) so that it may dynamically power the flexible datacenter (200 of FIG. 2) when conditions change.

One of ordinary skill in the art will recognize that a datacenter control system (220 of FIG. 4) may dynamically modulate power delivery to one or more computing systems (100 of FIG. 2) of a flexible datacenter (200 of FIG. 2) based on behind-the-meter power availability or an operational directive. The flexible datacenter (200 of FIG. 2) may transition between a fully powered down state (while the datacenter control system remains powered), a fully powered up state, and various intermediate states in between. In addition, flexible datacenter (200 of FIG. 2) may have a blackout state, where all power consumption, including that of the datacenter control system (220 of FIG. 4) is halted. However, once the flexible datacenter (200 of FIG. 2) enters the blackout state, it will have to be manually rebooted to restore power to datacenter control system (220 of FIG. 4). Local station conditions or operational directives may cause flexible datacenter (200 of FIG. 2) to ramp-up, reduce power consumption, change power factor, or ramp-down.

Operations related to a distributed power control system will now be described in greater detail. In particular, such operations will be described with respect to FIG. 10, which shows a distributed power control system 1000 in accordance with one or more embodiments of the present invention. The distributed power control system 1000 is similar to the control distribution scheme 400 illustrated in FIG. 4, with the addition of a behind-the-meter power source 1002, as well as the plurality of computing systems 100 of the flexible datacenter 200 described above. Components and aspects illustrated and/or described in FIG. 10 that are similar or the same as components or aspects illustrated and/or described in FIG. 4 (or any other Figure in which a component shown in FIG. 10 is also illustrated) can have the same characteristics as previously illustrated and/or described, or, in some embodiments, could have different characteristics.

The behind-the-meter power source 1002 can take the form of any one or more components related to behind-the-meter power generation discussed above. For example, the behind-the-meter power source 1002 can include one or more wind turbines (e.g., wind turbines 610) of a wind farm (e.g., wind farm 600) and associated collectors or transformers. Other sources of behind-the-meter power are possible as well, such as one or more solar panels 710. As shown, the behind-the-meter power source 1002 can have a connection 1004 with the local station control system 410, a connection 1006 with the behind-the-meter power input system 210 of the flexible datacenter 200, and a connection 1008 with the remote master control system 420. Any one or more of these connections can be networked connections or hardwired connections. In alternative embodiments, the behind-the-meter power source 1002 can have more or less connections than those shown in FIG. 10. (For example, the behind-the-meter power source 1002 could have a connection (not shown) with the grid operator 440.

Figure 10:
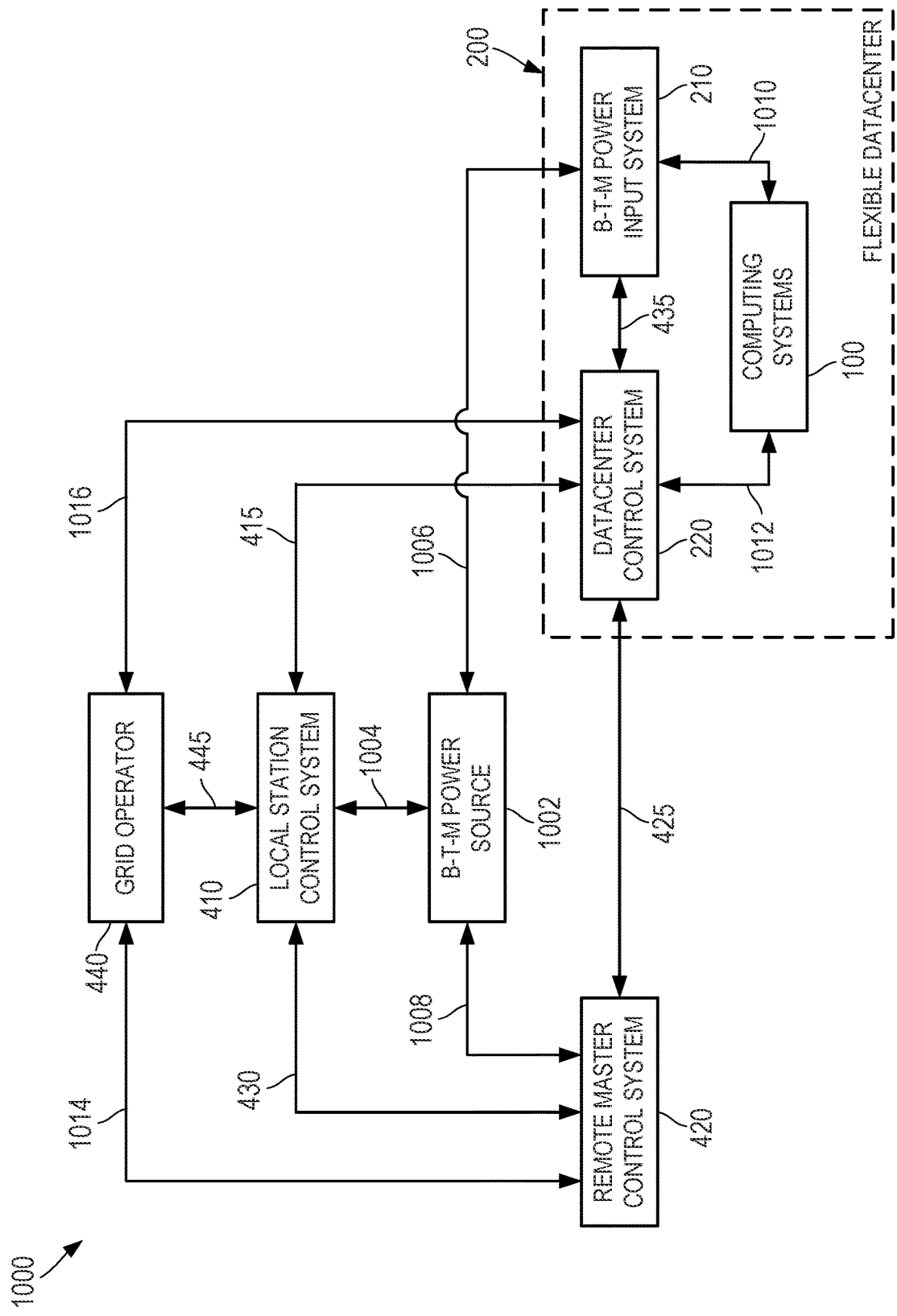
FIG. 10 shows a distributed power control system in accordance with one or more embodiments of the present invention.

Also shown in FIG. 10 is a connection 1010 between the computing systems 100 and the datacenter control system 220, as well as a connection 1012 between the computing systems 100 and the behind-the-meter power input system 210.

Further, FIG. 10 shows a connection 1014 between the grid operator 440 and the remote master control system 420, as well as a connection 1016 between the grid operator 440 and the datacenter control system 220.

More or less connections between any two or more components shown in FIG. 10 are possible.

Any communication (e.g., electronic signals, power, etc.) described below as being between two or more components of the distributed power control system 1000 can occur over any one or more of the connections shown in FIG. 10. For example, a signal transmitted from the local station control system 410 to the datacenter control system 220 could be transmitted directly over connection 415. Additionally or alternatively, the same signal could be transmitted via the remote master control system 420 over connection 430 and connection 425. Other examples are possible as well.

In line with the discussion above, the behind-the-meter input system 210 can receive power from the behind-the-meter power source 1002 and deliver power to the computing systems 100 in order to power the computing systems 100. Further, the computing systems 100 can receive instructions, such as those for performing computational operations, from the datacenter control system 220. Still further, the datacenter control system 220 can be configured to control the computing systems 100 and the behind-the-meter power input system 210.

The remote master control system 420 can manage resources, such as power and data, related to the distributed power control system 1000 and can manage operations or data associated with any one or more of the components shown in FIG. 10, such as the datacenter control system 220 and/or the behind-the-meter power source 1002. The remote master control system 420 can be located at the site of the flexible datacenter 200 or at a site associated with an enterprise that controls the remote master control system 420. Additionally or alternatively, the remote master control system 420 can be a cloud-based computing system. Further, the remote master control system 420 can be configured to issue instructions (e.g., directives) to the flexible datacenter 200 (e.g., to the datacenter control system 220) that affect an amount of behind-the-meter power consumed by the flexible datacenter 200.

The local station control system 410 can be configured to at least partially control the behind-the-meter power source 1002. Additionally or alternatively, the behind-the-meter power source 1002 can be controlled at least in part by the remote master control system 420. The local station control system 410 can be located at the site of the behind-the-meter power source 1002 or elsewhere. The local station control system 410 can be operated independently from the remote master control system 420. That is, the two control systems can be operated by different entities (e.g., enterprises or individuals). In some embodiments, little or no communication can occur between the local station control system 410 and the remote master control system 420.

As discussed above, there may be scenarios in which it may be desirable for the local station control system 410 to be able to communicate with the flexible datacenter 200. The distributed power control system 1000 shown in FIG. 10 can facilitate operations along these lines. The following operations will be discussed primarily with respect to ramp-down power consumption scenarios. However, it should be understood that operations and directives related to ramp-up power consumption or other management of power consumption by the flexible datacenter 200 are possible as well, in addition to or alternative to ramp-down scenarios.

For any one or more reasons, it may be desirable for the local station control system 410 to direct the flexible datacenter 200 to modulate its power consumption (e.g., by ramping down, ramping up, or otherwise making an adjustment affecting power consumption by the flexible datacenter 200). For example, if there is insufficient available behind-the-meter power, and/or an emergency related to the behind-the-meter power source 1002 (e.g., a fire, or a bird flying into or proximate to a wind turbine), the local station control system 410 can send, to the datacenter control system 220, and thus the datacenter control system 220 can receive— from the local station control system 410 directly and/or via the remote master control system 420—a first operational directive for the flexible datacenter 200 to ramp-down power consumption. In response to receiving the first operational directive, the datacenter control system 220 can cause (e.g., issue instructions to) the computing systems 100 of the flexible datacenter 200 to perform a first set of predetermined operations correlated with the first operational directive. Particularly, the first set of predetermined operations can include any one or more predetermined operations that result in reduced consumption of the behind-the-meter power by one or more of the computing systems 100. Examples of such predetermined operations will be described in more detail below.

Hereinafter, for brevity's sake, reference to actions performed with respect to "the computing systems 100," such as causing the computing systems 100 to perform the first set of predetermined operations, reducing behind-the-meter power consumption, etc., means that such actions can be performed with respect to any one or more of the computing systems 100. For example, the flexible datacenter 200 can cause one computing system, all of the computing systems 100, or any number in between, to perform the first set of predetermined operations, such as reducing power consumption and/or turning off.

To facilitate the act of causing the performance of the first set of predetermined operations, for example, the datacenter control system 220 (and/or the computing systems 100) can have access to memory that stores reference data (e.g., a reference table) that correlates respective conditions with a respective set of predetermined operations. Thus, upon receipt of the first operational directive, the datacenter control system 220 can refer to the reference data to look up which set of predetermined operations the computing systems 100 should perform (that is, which set is correlated to the first operational directive that is received), and then responsively instruct the computing systems 100 to perform the appropriate set of predetermined operations. Additionally or alternatively, the act of instructing the computing systems 100 in this manner can involve instructing the computing systems 100 to refer to the reference data in order to determine which set of predetermined operations to perform and then performing that set of predetermined operations.

In the embodiments discussed above or in alternative embodiments, the grid operator 440, in addition to or alternative to the local station control system 410, could issue the directive to datacenter control system 220. For example, the grid operator 440 can directly send the first operational directive to the datacenter control system 220 via connection 1016. Additionally or alternatively, the grid operator 440 can send the first operational directive to the remote master control system 420 via connection 1014, which can in turn send the first operational directive to the datacenter control system 220.

As noted above, the reason for directing the flexible datacenter 200 to ramp-down power consumption can be that there has been a reduced generation of behind-the-meter power by the behind-the-meter power source 1002, which can occur for any number of reasons such as those described herein. As such, the first operational directive can be associated with a reduced power generation condition of the behind-the-meter power source. The reduced power generation condition can be associated with a current or expected reduction in available behind-the-meter power below a predetermined availability level. For example, if the amount of available behind-the-meter power has dropped below a predetermined availability level (e.g., 10 megawatts (MW)) or is expected (e.g., predicted using any forecasting algorithm or technique employed by the local station control system 410 or other device) to fall below the predetermined availability level (e.g., currently at 20 MW, and forecasted to drop below 10 MW), the local station control system 410 can direct the datacenter control system 220 to ramp-down power consumption by the flexible datacenter 200. Additionally or alternatively, a ramp-down condition could be detected if the current or expected extent of reduction of available behind-the-meter power exceeds a predetermined amount (e.g., a drop of 10 MW). Additionally or alternatively, a ramp-down condition could take any of the other forms discussed above.

It should be understood that the reason for directing the flexible datacenter 200 to ramp-down power consumption can relate to behind-the-meter power availability, but can be a reason different from a current or expected reduction in available behind-the-meter power. Further, it should be understood that other conditions could be taken into consideration in addition to or alternative to conditions related to power availability, such as economic conditions.

As further noted above, performance of the first set of predetermined operations can result in the computing systems 100 reducing consumption of behind-the-meter power. In some scenarios, it may be desirable for the computing systems 100 to quickly (e.g., as soon as possible, and/or within a predetermined period of time) stop performing any computational operation that the computing systems 100 are currently performing, and perhaps also to quickly turn off and disconnect from any network(s) to which the computing systems 100 can be connected. In these scenarios, the first set of predetermined operations could include turning off the computing systems 100, and perhaps also for the computing systems 100 to disconnect form any network(s) to which the computing systems 100 are connected. Other predetermined operations are possible as well.

However, in other scenarios, it may be desirable and feasible to more slowly ramp down power consumption. As such, the first set of predetermined operations could include computational operations that can result in a more gradual ramp-down of power consumption by the computing systems 100.

For example, the first set of predetermined operations can include reducing a computational speed of the computing systems 100. More particularly, the first set of predetermined operations can include reducing a computational speed of the computing systems 100 to be at a predetermined rate.

Additionally or alternatively, as another example, the first set of predetermined operations can include the computing systems 100 (i) completing one or more computational tasks (e.g., blockchain hashing functions or other data processing related to or unrelated to blockchain) that the computing systems 100 are currently performing or scheduled to perform and (ii) ramp-down power consumption and enter into a reduced-power state of operation. As a more particular example, the first set of predetermined operations can include the computing systems 100 completing the one or more computational tasks within a period of time (e.g., ten minutes). The period of time can be determined by the datacenter control system 220, specified by the local station control system 410 in the first operational directive, or otherwise conveyed to the datacenter control system 220 to in turn convey to the computing systems 100. Further, the period of time can vary depending on the condition that triggers the first operational directive to be sent. If there is an emergency where the available behind-the-meter power has dropped below a particular threshold or the extent of reduction exceeds a particular extent, the period of time may be shorter (e.g., two minutes) than in other scenarios in which it is feasible to take more time to complete computational tasks.

Additionally or alternatively, as another example, the first set of predetermined operations can include the computing systems 100 completing less than an entirety of any one or more of the one or more computational tasks that the computing systems 100 are currently performing or scheduled to perform. In particular, the first set of predetermined operations can include the computing systems 100, before a given computational task has been completed, (i) completing a portion of the computational task, (ii) communicating to the datacenter control system 220 a result or results of the completed portion of the computational task, and then (iii) ramp-down power consumption and enter into a reduced-power state of operation. In some embodiments, this example predetermined operation can involve the computing systems 100 determining a point (or reaching a predetermined point specified by the first operational directive or by a command from the datacenter control system 220) where the computing systems 100 can stop performing the computational task and then completing the computational task up to that point. For instance, if the computing systems 100 has a certain amount of data to process, the computing systems 100 can stop after half of the data has been processed and send the processed data to the datacenter control system 220. Additionally or alternatively, this example predetermined operation can involve the computing systems 100 communicating, along with the result of the completed portion of the computational task, an indication of the stopping point, so that the computational task can be resumed by the same computing system(s) or different computing system(s) at the stopping point. Other variations of this example predetermined operation are possible as well.

Additionally or alternatively, as another example, the first set of predetermined operations can include the computing systems 100 reducing a load factor or other factor that defines an extent of energy usage by the computing systems 100, thereby reducing power consumption. For example, the first set of predetermined operations can include having the computing systems 100 reduce a load factor to a predetermined load factor, such as reducing to a 50% load.

The first set of predetermined operations can include other operations as well, such as any of the operations described with respect to other Figures herein in relation to ramp-down conditions.

As noted above, in some embodiments, the first set of predetermined operations can be selected based on other power-related decisions. For example, if there are ten computing systems at the flexible datacenter 200 and a 10% decrease in power consumption is desired, the datacenter control system 220 can either (i) cause one of the ten computing systems to turn off and stop consuming power or (ii) cause each of the ten computing systems to reduce its respective power consumption by 10%. Thus, performance of the first set of predetermined operations can at times result in one or more (but possibly not all) of the computing systems 100 being turned off to achieve a desired power consumption reduction, or can result in all of the computing systems 100 reducing its respective power consumption by a predetermined amount, which could be specified by the first operational directive or dynamically determined by the datacenter control system 220 in response to receiving the first operational directive.

In some embodiments, the datacenter control system 220 can perform other operations in response to receiving the first operational directive. For example, the datacenter control system 220 can cause the behind-the-meter power input system 210 to reduce the power delivered to the computing systems 100. This reduction by the behind-the-meter power input system 210 can be performed before performance, during performance, or after performance of the first set of predetermined operations by the computing systems 100. Thus, two different forms of power control can be advantageously employed: controlling the computing systems 100 to reduce the amount of power that the computing systems 100 pull, and controlling the behind-the-meter power input system 210 to push less power to the computing systems 100.

At some point before, during, or after the datacenter control system 220 receives the first operational directive and causes the computing systems 100 to perform the first set of predetermined operations, the datacenter control system 220 can receive—from the local station control system 410 directly and/or via the remote master control system 420—a second operational directive. The second operational directive can be in some way associated with an existing or anticipated situation in which ramping up power consumption by the flexible datacenter 200 would be desirable or would not likely have a negative impact. In some embodiments, the second operational directive can be associated with a non-reduced power generation condition of the behind-the-meter power source 1002. For example, the non-reduced power generation condition could indicate that there is a current or expected increase in available behind-the-meter power above a predetermined availability level. The non-reduced power generation condition could take additional or alternative forms as well. (For instance, the flexible datacenter 200 might not ramp-up power consumption even if there is an increase or an excess of available behind-the-meter power.) Additionally or alternatively, conditions other than non-reduced power conditions could in some way contribute to the second operational directive being sent to the datacenter control system 220.

In any event, the second operational directive can be an operational directive that indicates to the flexible datacenter 200 that the flexible datacenter 200 is permitted to ramp-up power consumption. In some embodiments, the flexible datacenter 200 might be configured such that it cannot ramp-up power consumption by the computing systems 100 the flexible datacenter 200 without permission from the local station control system 410, although in other embodiments, the flexible datacenter 200 might not be configured in this way.

Furthermore, the datacenter control system 220 can be configured such that, upon or after receipt of the second operational directive (and, in some embodiments, in response to the received second operational directive indicating that permission is granted to ramp-up power consumption), the datacenter control system 220 can determine whether a ramp-up condition exists and, in response to determining that the ramp-up condition exists, the datacenter control system 220 can cause the computing systems 100 to perform a second set of predetermined operations correlated with the second operational directive.

The reason(s) for directing the flexible datacenter 200 to ramp-up power consumption can vary, and thus the ramp-up condition could take various forms, such as any of the ramp-up conditions discussed above (e.g., when there is an excess of available behind-the-meter power). In some scenarios, however, the reason for directing the flexible datacenter 200 to ramp-up power consumption can be something other than there being an excess of available behind-the-meter power. For instance, there could be one or more economic-driven reasons for doing so, and in that scenario, the local station control system 410 and/or the remote master control system 420 could direct the flexible datacenter to ramp-up power consumption, or at least notify the flexible datacenter 200 that ramping up power consumption is permitted.

In some embodiments, the datacenter control system 220 causing the computing systems 100 to perform the second set of predetermined operations can result in increased consumption of the behind-the-meter power by the computing systems 100.

For example, the second set of predetermined operations can include increasing the computational speed of the computing systems 100. More particularly, the second set of predetermined operations can include increasing a computational speed of the computing systems 100 to be at a predetermined rate.

As another example, the second set of predetermined operations can include turning on the computing systems 100, connecting to a server or servers, resuming one or more computational tasks (e.g., at a previously-identified stopping point), beginning performance of one or more computational tasks, and/or other possible operations including, but not limited to, any of the operations described with respect to other Figures herein in relation to ramp-up conditions.

In some scenarios, despite some conditions being present where ramping up power consumption could be appropriate, it might not be desirable to ramp up power consumption even if those conditions are present. For example, the local station control system 410 (and/or the remote master control system 420) could determine that, over a recent period of time, there have been fluctuations in available behind-the-meter power (e.g., fluctuations that exceed a predetermined threshold) and/or a combination of ramp-up and ramp-down operations that were performed by the computing systems 100. As such, the second set of predetermined operations can include the computing systems 100 continuing performance of operations in which the computing systems 100 are currently engaged. In alternative embodiments, the datacenter control system 220 could determine that the flexible datacenter 200 should not ramp up power consumption and, instead of causing the computing systems 100 to perform operations, responsively take no special action with respect to the computing systems 100.

In some embodiments, the datacenter control system 220 can perform other operations in response to receiving the second operational directive. For example, the datacenter control system 220 can cause the behind-the-meter power input system 210 to increase the power delivered to the computing systems 100. This increase by the behind-the-meter power input system 210 can be performed before performance, during performance, or after performance of the second set of predetermined operations by the computing systems 100.

Embodiments discussed above primarily relate to the local station control system 410 issuing directives to the flexible datacenter 200 to modulate the flexible datacenter's power consumption. Additionally or alternatively, in some scenarios, it could be desirable for the remote master control system 420 itself to be able to monitor for the presence of any one or more of a variety of conditions and responsively issue such directives to the flexible datacenter 200. One reason as to why this can be desirable is due to how the local station control system 410 and the remote master control system 420 can be operated independently by different entities. Thus, for the purposes of power control, configuring a component of the distributed power control system 1000 that is operated by or otherwise associated with one entity (e.g., an enterprise), such as the remote master control system 420, to monitor conditions and issue directives to the flexible datacenter 200 can reduce or eliminate a dependence on components that are operated by or otherwise associated with another entity (e.g., a different enterprise).

As an example, there could be a scenario in which the remote master control system 420 is configured in such a manner in which it detects that the behind-the-meter power source 1002 is experiencing a reduced power generation condition, unfavorable economic condition, or another type of monitored condition (such as any of those discussed above) requiring a ramp-down in power consumption by the flexible datacenter 200 before the local station control system 410 detects the condition. Thus, the remote master control system 420 can quickly take responsive action and issue a directive (e.g., the first operational directive) to the flexible datacenter 200 to cause the flexible datacenter 200 to ramp down. Additionally or alternatively, the remote master control system 420 might be configured use a predictive algorithm of other technique to predict when ramping down would be required in the future and can preemptively direct the flexible datacenter 200 to ramp down immediately or at a scheduled time. (It should be understood, however, that conversely, in some situations, the local station control system 410 might be able to react more quickly than a remote master control system 420 in directing a ramp-down. One example reason for this is that actions by the local station control system 410 might not require any routing through a remote master control system 420, and thus might not be limited by a potential delay or blocking action by the remote master control system 420. Thus, in such situations, it might be desirable to have the local station control system 410 issue directives to the flexible datacenter 200.)

For any one or more reasons, it may be desirable for the remote master control system 420 to direct the flexible datacenter 200 to modulate its power consumption (e.g., by ramping down, ramping up, or otherwise making an adjustment affecting power consumption by the flexible datacenter 200), such as if there is insufficient available behind-the-meter power, and/or an emergency related to the behind-the-meter power source 1002. The following operations will be discussed primarily with respect to ramp-down power consumption scenarios. However, it should be understood that operations and directives related to ramp-up power consumption or other management of power consumption by the flexible datacenter 200 are possible as well, in addition to or alternative to ramp-down scenarios.

In an example embodiment, the remote master control system 420 can determine that a reduced power generation condition has been met. In response to determining that the reduced power generation condition has been met, the remote master control system 420 can generate and send, to the datacenter control system 220 (and thus the datacenter control system 220 can receive from the remote master control system 420), a first operational directive for the flexible datacenter 200 to ramp-down power consumption. In response to receiving the first operational directive, the datacenter control system 220 can cause (e.g., issue instructions to) the computing systems 100 of the flexible datacenter 200 to perform a first set of predetermined operations correlated with the first operational directive. Particularly, the first set of predetermined operations can include any one or more predetermined operations that result in reduced consumption of the behind-the-meter power by one or more of the computing systems 100. Examples of such predetermined operations will be described in more detail below.

As noted above, the reason for the remote master control system 420 directing the flexible datacenter 200 to ramp-down power consumption can be that there has been a reduced generation of behind-the-meter power by the behind-the-meter power source 1002, which can occur for any number of reasons such as those described herein. As such, the first operational directive can be associated with a reduced power generation condition of the behind-the-meter power source. The reduced power generation condition can be associated with a current or expected reduction in available behind-the-meter power below a predetermined availability level. For example, if the amount of available behind-the-meter power has dropped below a predetermined availability level (e.g., 10 MW) or is expected (e.g., predicted using any forecasting algorithm or technique employed by the remote master control system 420) to fall below the predetermined availability level (e.g., currently at 20 MW, and forecasted to drop below 10 MW), the remote master control system 420 can direct the datacenter control system 220 to ramp-down power consumption by the flexible datacenter 200. Additionally or alternatively, a ramp-down condition could be detected if the current or expected extent of reduction of available behind-the-meter power exceeds a predetermined amount (e.g., a drop of 10 MW). Additionally or alternatively, a ramp-down condition could take any of the other forms discussed above.

It should be understood that the reason for directing the flexible datacenter 200 to ramp-down power consumption can relate to behind-the-meter power availability, but can be a reason different from a current or expected reduction in available behind-the-meter power. Further, it should be understood that other conditions could be taken into consideration in addition to or alternative to conditions related to power availability, such as economic conditions. (However, in some embodiments, the remote master control system 420 might only monitor behind-the-meter power availability conditions.)

As further noted above, performance of the first set of predetermined operations can result in the computing systems 100 reducing consumption of behind-the-meter power. In some scenarios, it may be desirable for the computing systems 100 to quickly (e.g., as soon as possible, and/or within a predetermined period of time) stop performing any computational operation that the computing systems 100 are currently performing, and perhaps also to quickly turn off and disconnect from any network(s) to which the computing systems 100 can be connected. In these scenarios, the first set of predetermined operations could include turning off the computing systems 100, and perhaps also for the computing systems 100 to disconnect form any network(s) to which the computing systems 100 are connected. Other predetermined operations are possible as well.

However, in other scenarios, it may be desirable and feasible to more slowly ramp down power consumption. As such, the first set of predetermined operations could include computational operations that can result in a more gradual ramp-down of power consumption by the computing systems 100.

For example, the first set of predetermined operations can include reducing a computational speed of the computing systems 100. More particularly, the first set of predetermined operations can include reducing a computational speed of the computing systems 100 to be at a predetermined rate.

Additionally or alternatively, as another example, the first set of predetermined operations can include the computing systems 100 (i) completing one or more computational tasks (e.g., blockchain hashing functions or other data processing related to or unrelated to blockchain) that the computing systems 100 are currently performing or scheduled to perform and (ii) ramp-down power consumption and enter into a reduced-power state of operation. As a more particular example, the first set of predetermined operations can include the computing systems 100 completing the one or more computational tasks within a period of time (e.g., ten minutes). The period of time can be determined by the datacenter control system 220, specified by the remote master control system 420 in the first operational directive, or otherwise conveyed to the datacenter control system 220 to in turn convey to the computing systems 100. Further, the period of time can vary depending on the condition that triggers the first operational directive to be sent. If there is an emergency where the available behind-the-meter power has dropped below a particular threshold or the extent of reduction exceeds a particular extent, the period of time may be shorter (e.g., two minutes) than in other scenarios in which it is feasible to take more time to complete computational tasks.

Additionally or alternatively, as another example, the first set of predetermined operations can include the computing systems 100 completing less than an entirety of any one or more of the one or more computational tasks that the computing systems 100 are currently performing or scheduled to perform. In particular, the first set of predetermined operations can include the computing systems 100, before a given computational task has been completed, (i) completing a portion of the computational task, (ii) communicating to the datacenter control system 220 a result or results of the completed portion of the computational task, and then (iii) ramp-down power consumption and enter into a reduced-power state of operation. In some embodiments, this example predetermined operation can involve the computing systems 100 determining a point (or reaching a predetermined point specified by the first operational directive or by a command from the datacenter control system 220) where the computing systems 100 can stop performing the computational task and then completing the computational task up to that point. For instance, if the computing systems 100 has a certain amount of data to process, the computing systems 100 can stop after half of the data has been processed and send the processed data to the datacenter control system 220. Additionally or alternatively, this example predetermined operation can involve the computing systems 100 communicating, along with the result of the completed portion of the computational task, an indication of the stopping point, so that the computational task can be resumed by the same computing system(s) or different computing system(s) at the stopping point. Other variations of this example predetermined operation are possible as well.

Additionally or alternatively, as another example, the first set of predetermined operations can include the computing systems 100 reducing a load factor or other factor that defines an extent of energy usage by the computing systems 100, thereby reducing power consumption. For example, the first set of predetermined operations can include having the computing systems 100 reduce a load factor to a predetermined load factor, such as reducing to a 50% load.

In some embodiments, the first set of predetermined operations can be selected based on other power-related decisions. For example, if there are ten computing systems at the flexible datacenter 200 and a 10% decrease in power consumption is desired, the datacenter control system 220 can either (i) cause one of the ten computing systems to turn off and stop consuming power or (ii) cause each of the ten computing systems to reduce its respective power consumption by 10%. Thus, performance of the first set of predetermined operations can at times result in one or more, but not all, of the computing systems 100 being turned off, or can result in all of the computing systems 100 reducing its respective power consumption by a predetermined amount, which could be specified by the first operational directive or dynamically determined by the datacenter control system 220 in response to receiving the first operational directive.

The first set of predetermined operations can include other operations as well, such as any of the operations described with respect to other Figures herein in relation to ramp-down conditions.

As noted above, in some embodiments, the first set of predetermined operations can be selected based on other power-related decisions. For example, if there are ten computing systems at the flexible datacenter 200 and a 10% decrease in power consumption is desired, the datacenter control system 220 can either (i) cause one of the ten computing systems to turn off and stop consuming power or (ii) cause each of the ten computing systems to reduce its respective power consumption by 10%. Thus, performance of the first set of predetermined operations can at times result in one or more (but possibly not all) of the computing systems 100 being turned off to achieve a desired power consumption reduction, or can result in all of the computing systems 100 reducing its respective power consumption by a predetermined amount, which could be specified by the first operational directive or dynamically determined by the datacenter control system 220 in response to receiving the first operational directive.

The remote master control system 420 can monitor and maintain (or otherwise have access to) performance data and/or other data related to the computing systems 100 to which other systems (e.g., the local station control system 410) might not have access. Because the remote master control system 420 might have more intimate knowledge of what each of the computing systems 100 are capable of and/or the types of computational tasks that each of the computing systems 100 are performing (e.g., whether some computing systems are carrying out more critical or computationally-intensive tasks than others), it can be advantageous to have the remote master control system 420 determine and send the first operational directive.

In some embodiments, the datacenter control system 220 can perform other operations in response to receiving the first operational directive. For example, the datacenter control system 220 can cause the behind-the-meter power input system 210 to reduce the power delivered to the computing systems 100. This reduction by the behind-the-meter power input system 210 can be performed before performance, during performance, or after performance of the first set of predetermined operations by the computing systems 100. Thus, two different forms of power control can be advantageously employed: controlling the computing systems 100 to reduce the amount of power that the computing systems 100 pull, and controlling the behind-the-meter power input system 210 to push less power to the computing systems 100.

At some point before, during, or after the datacenter control system 220 receives the first operational directive and causes the computing systems 100 to perform the first set of predetermined operations, the datacenter control system 220 can receive from the remote master control system 420 a second operational directive generated by the remote master control system 420. The second operational directive can be in some way associated with an existing or anticipated situation in which ramping up power consumption by the flexible datacenter 200 would be desirable or would not likely have a negative impact. In some embodiments, the second operational directive can be associated with a non-reduced power generation condition of the behind-the-meter power source 1002. For example, the non-reduced power generation condition could indicate that there is a current or expected increase in available behind-the-meter power above a predetermined availability level. The non-reduced power generation condition could take additional or alternative forms as well. (For instance, the flexible datacenter 200 might not ramp-up power consumption even if there is an increase or an excess of available behind-the-meter power.) Additionally or alternatively, conditions other than non-reduced power conditions could in some way contribute to the second operational directive being sent to the datacenter control system 220.

In any event, the second operational directive can be an operational directive that indicates to the flexible datacenter 200 that the flexible datacenter 200 is permitted to ramp-up power consumption. In some embodiments, the flexible datacenter 200 might be configured such that it cannot ramp-up power consumption by the computing systems 100 the flexible datacenter 200 without permission from the remote master control system 420 (and/or from the local station control system 410), although in other embodiments, the flexible datacenter 200 might not be configured in this way.

Furthermore, the datacenter control system 220 can be configured such that, upon or after receipt of the second operational directive (and, in some embodiments, in response to the received second operational directive indicating that permission is granted to ramp-up power consumption), the datacenter control system 220 can determine whether a ramp-up condition exists and, in response to determining that the ramp-up condition exists, the datacenter control system 220 can cause the computing systems 100 to perform a second set of predetermined operations correlated with the second operational directive.

The reason(s) for directing the flexible datacenter 200 to ramp-up power consumption can vary, and thus the ramp-up condition could take various forms, such as any of the ramp-up conditions discussed above (e.g., when there is an excess of available behind-the-meter power). In some scenarios, however, the reason for directing the flexible datacenter 200 to ramp-up power consumption can be something other than there being an excess of available behind-the-meter power. For instance, there could be one or more economic-driven reasons for doing so, and the remote master control system 420 could, in that scenario, direct the flexible datacenter to ramp-up power consumption, or at least notify the flexible datacenter 200 that ramping up power consumption is permitted.

In some embodiments, the datacenter control system 220 causing the computing systems 100 to perform the second set of predetermined operations can result in increased consumption of the behind-the-meter power by the computing systems 100.

For example, the second set of predetermined operations can include increasing the computational speed of the computing systems 100. More particularly, the second set of predetermined operations can include increasing a computational speed of the computing systems 100 to be at a predetermined rate.

As another example, the second set of predetermined operations can include turning on the computing systems 100, connecting to a server or servers, resuming one or more computational tasks (e.g., at a previously-identified stopping point), beginning performance of one or more computational tasks, and/or other possible operations including, but not limited to, any of the operations described with respect to other Figures herein in relation to ramp-up conditions.

In some scenarios, despite some conditions being present where ramping up power consumption could be appropriate, it might not be desirable to ramp up power consumption even if those conditions are present. For example, the remote master control system 420 could determine that, over a recent period of time, there have been fluctuations in available behind-the-meter power (e.g., fluctuations that exceed a predetermined threshold) and/or a combination of ramp-up and ramp-down operations that were performed by the computing systems 100. As such, the second set of predetermined operations can include the computing systems 100 continuing performance of operations in which the computing systems 100 are currently engaged. In alternative embodiments, the datacenter control system 220 could determine that the flexible datacenter 200 should not ramp up power consumption and, instead of causing the computing systems 100 to perform operations, responsively take no special action with respect to the computing systems 100.

In some embodiments, the datacenter control system 220 can perform other operations in response to receiving the second operational directive. For example, the datacenter control system 220 can cause the behind-the-meter power input system 210 to increase the power delivered to the computing systems 100. This increase by the behind-the-meter power input system 210 can be performed before performance, during performance, or after performance of the second set of predetermined operations by the computing systems 100.

Figure 11:
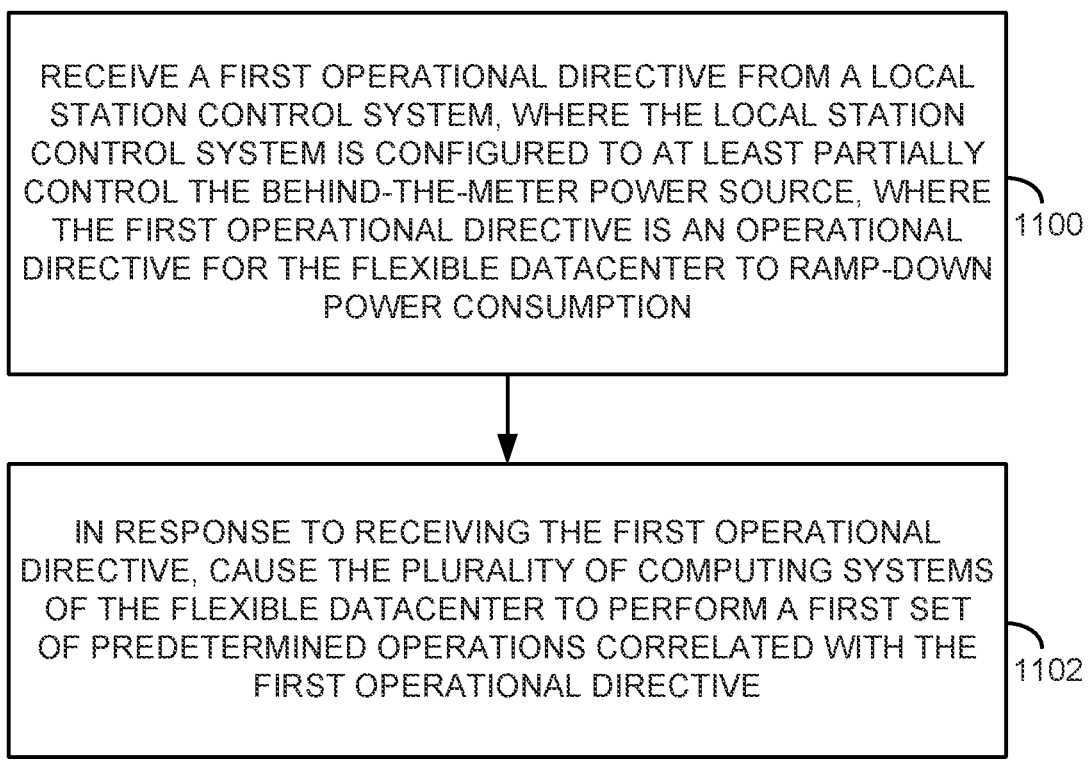
FIG. 11 shows a flowchart for the operation of the distributed power control system in accordance with one or more embodiments of the present invention.

FIG. 11 shows a flowchart for the operation of the distributed power control system in accordance with one or more embodiments of the present invention. In particular, FIG. 11 relates to one or more embodiments in which a local station control system sends a directive for ramping down power consumption. The process illustrated by FIG. 11 can be carried out by a datacenter control system, such as the datacenter control system 220 of the flexible datacenter 200 described above, in an environment such as the distributed power control system 1000 shown in FIG. 10. However, the process can be carried out by other types of computing devices or combinations of computing devices, and can be carried out in other environments.

Further, the embodiment of FIG. 11 can be simplified by the removal of any one or more of the features shown therein. Further, this embodiment can be combined with features, aspects, and/or implementations of any of the previous figures or otherwise described herein.

At block 1100, the datacenter control system 220 receives a first operational directive from a local station control system (e.g., local station control system 410). As discussed above, the local station control system can be configured to at least partially control the behind-the-meter power source (e.g., behind-the-meter power source 1002), and the first operational directive can be an operational directive for the flexible datacenter to ramp-down power consumption.

At block 1102, in response to receiving the first operational directive, the datacenter control system 220 causes the plurality of computing systems (e.g., computing systems 100) of the flexible datacenter to perform a first set of predetermined operations correlated with the first operational directive.

Furthermore, as discussed above, in the same embodiment or a different embodiment, the datacenter control system 220 can receive a second operational directive from the local station control system. In response to receiving the second operational directive, the datacenter control system 220 can determine whether a ramp-up condition exists and, in response to determining that the ramp-up condition exists, can cause the plurality of computing systems of the flexible datacenter to perform a second set of predetermined operations correlated with the second operational directive.

Figure 12:
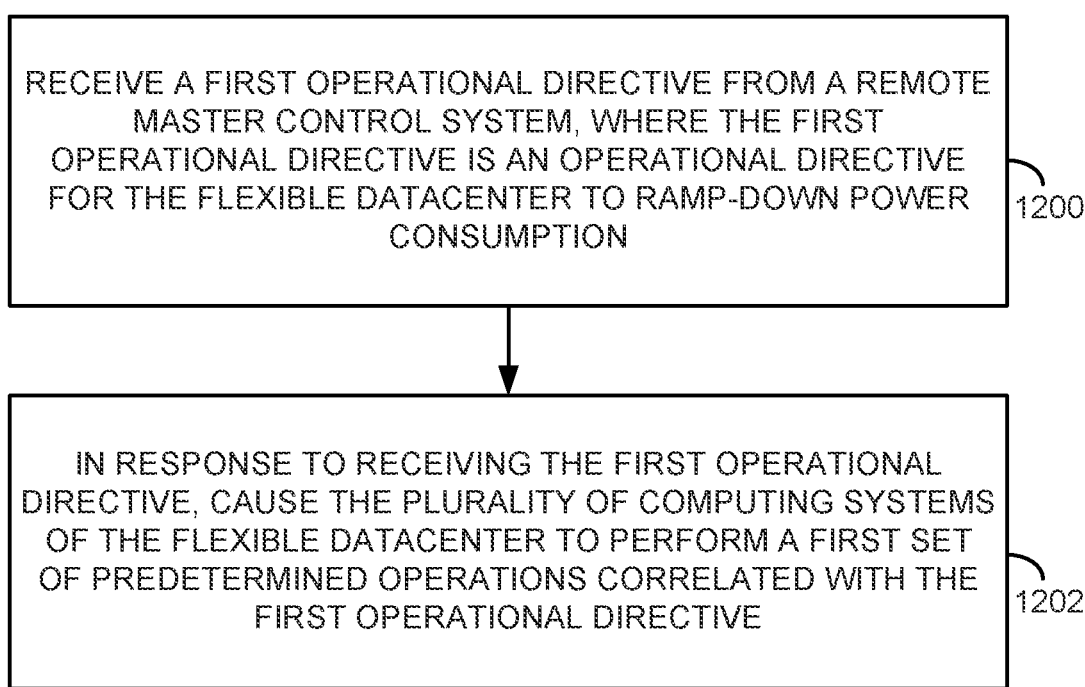
FIG. 12 shows another flowchart for the operation of the distributed power control system in accordance with one or more embodiments of the present invention.

FIG. 12 shows another flowchart for the operation of the distributed power control system in accordance with one or more embodiments of the present invention. In particular, FIG. 12 relates to one or more embodiments in which a remote master control system sends a directive for ramping down power consumption. The process illustrated by FIG. 12 can be carried out by a datacenter control system, such as the datacenter control system 220 of the flexible datacenter 200 described above, in an environment such as the distributed power control system 1000 shown in FIG. 10. However, the process can be carried out by other types of computing devices or combinations of computing devices, and can be carried out in other environments.

Further, the embodiment of FIG. 12 can be simplified by the removal of any one or more of the features shown therein. Further, this embodiment can be combined with features, aspects, and/or implementations of any of the previous figures or otherwise described herein.

At block 1200, the datacenter control system 220 receives a first operational directive from a remote master control system (e.g., remote master control system 420). As discussed above, the first operational directive can be an operational directive for the flexible datacenter to ramp-down power consumption.

At block 1202, in response to receiving the first operational directive, the datacenter control system 220 causes the plurality of computing systems (e.g., computing systems 100) of the flexible datacenter to perform a first set of predetermined operations correlated with the first operational directive.

Furthermore, as discussed above, in the same embodiment or a different embodiment, the datacenter control system 220 can receive a second operational directive from the remote master control system. In response to receiving the second operational directive, the datacenter control system 220 can determine whether a ramp-up condition exists and, in response to determining that the ramp-up condition exists, can cause the plurality of computing systems of the flexible datacenter to perform a second set of predetermined operations correlated with the second operational directive.

Advantages of one or more embodiments of the present invention may include one or more of the following:

In one or more embodiments of the present invention, a method and system for distributed power control allows for a datacenter control system of a flexible datacenter to be in communication with a local station control system, which in turn allows the local station control system to issue directives to the flexible datacenter based on various conditions associated with a behind-the-meter power source. Thus, the method and system for distributed power control allows for power consumption by the flexible datacenter to be modulated based on ramp-down and/or ramp-up directives received from the local station control system.

In some scenarios, a local station control system might be able to act more quickly than a remote master control system in directing a flexible datacenter to modulate its power consumption. In these and other scenarios, actions by the local station control system would not require communications (e.g., directives, or power availability information) to be routed through the remote master control system, and thus, such communications would not be blocked or delayed by the remote master control system.

Conversely, the remote master control system can act on information that is not available to the local station control system, such as performance data or other data related to the flexible datacenter and the computing systems thereof, as discussed above. For at least this reason, it could be advantageous in some scenarios to have the remote master control system direct the flexible datacenter in addition to or instead of the local station control system. (One of the reasons for why the local station control system might not have access to this type of information is that the flexible datacenter and the remote master control system are operated by or otherwise associated with the same entity, whereas the local station control system is operated by a different entity.) Thus, in one or more embodiments of the present invention, a method and system for distributed power control allows for a datacenter control system of a flexible datacenter to be in communication with a remote master control system, which in turn allows the remote master control system to issue directives to the flexible datacenter based on various conditions associated with a behind-the-meter power source. Thus, the method and system for distributed power control allows for power consumption by the flexible datacenter to be modulated based on ramp-down and/or ramp-up directives received from the remote master control system.

In one or more embodiments of the present invention, a method and system for distributed power control allows for a datacenter control system of a flexible datacenter to be in communication with a remote master control system, which in turn allows the remote master control system to issue directives to the flexible datacenter based on various conditions associated with a behind-the-meter power source. Thus, the method and system for distributed power control allows for power consumption by the flexible datacenter to be modulated based on ramp-down and/or ramp-up directives received from the remote master control system. As discussed above, this can be further advantageous because the flexible datacenter and the remote master control system can be operated by or otherwise associated with the same entity.

In one or more embodiments of the present invention, a method and system for distributed power control allows for reduction in power consumption by the flexible datacenter without necessarily having to abruptly turn off computing systems or disconnect from servers/networks. Rather, computing systems of the flexible datacenter can be directed to reduce power consumption in a smooth and more gradual manner that allows for the computing systems to finish at least a portion of the computational tasks assigned to them.

In one or more embodiments of the present invention, a method and system for distributed power control may be powered by unutilized behind-the-meter power that is free from transmission and distribution costs. As such, the flexible datacenter may perform computational operations, such as hashing function operations, with little to no energy cost.

One or more embodiments of the present invention also involve dynamic power delivery to the flexible datacenter using unutilized energy sources. Dynamic power delivery in this manner provides a green solution to two prominent problems: the exponential increase in power required for growing distributed computing operations (e.g., blockchain) and the unutilized and potentially wasted energy generated from renewable energy sources.

Dynamic power delivery in this manner also allows for the rapid deployment of datacenters to local stations. The datacenters may be deployed on site, near the source of power generation, and receive unutilized behind-the-meter power when it is available.

Dynamic power delivery in this manner also allows for the power delivery to the datacenter to be modulated based on conditions or an operational directive received from the local station or the grid operator.

Dynamic power delivery in this manner also provides a number of benefits to the hosting local station. The local station may use the flexible datacenter to adjust a load, provide a power factor correction, to offload power, or operate in a manner that invokes a production tax credit and/or generates incremental revenue.

It will also be recognized by the skilled worker that, in addition to improved efficiencies in controlling power delivery from intermittent generation sources, such as wind farms and solar panel arrays, to regulated power grids, the invention provides more economically efficient control and stability of such power grids in the implementation of the technical features as set forth herein.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A distributed power control system comprising:
    a plurality of flexible datacenters, each flexible datacenter comprising (i) a plurality of computing systems powered by a behind-the-meter (BTM) power input system, (ii) the BTM power input system configured to receive power from a power generation station prior to the power undergoing step-up transformation for transmission to a grid and deliver the power to the plurality of computing systems, and (iii) a datacenter control system configured to control the plurality of computing systems and the BTM power input system;
    a remote master control system configured to issue instructions to the plurality of flexible datacenters that affect an amount of BTM power consumed by the plurality of flexible datacenters;
    one or more processors; and
    data storage comprising a set of instructions that, when executed by the one or more processors, causes the remote master control system to:

detect a change in a condition affecting an availability of BTM power for powering the plurality of flexible datacenters;

determine, based on the change in the condition, an operational directive to modify power consumption by the plurality of flexible datacenters; and transmit the operational directive to the datacenter control system to cause the datacenter control system to modulate the amount of power consumed by the plurality of flexible datacenters based on the detected change in the condition.

2. The distributed power control system of claim 1, wherein the determination of the operational directive is further based on a status of the power generation station.

3. The distributed power control system of claim 1, wherein the determination of the operational directive is further based on a workload distributed to a first flexible datacenter of the plurality of flexible datacenters.

4. The distributed power control system of claim 2, wherein the determination of the operational directive is further based on an expected computational demand for the workload.

5. The distributed power control system of claim 3, wherein the set of instructions further causes the remote master control system to shift the workload from the first flexible datacenter to a second flexible datacenter of the plurality of datacenters.

6. The distributed power control system of claim 1, wherein the set of instructions further causes the remote master control system to transmit a specification of a sufficient amount of BTM power to be consumed by the plurality of flexible datacenters.

7. The distributed power control system of claim 1, wherein the transmission of the operational directive causes the datacenter control system to enable and disable delivery of the BTM power to the plurality of flexible datacenters.

8. The distributed power control system of claim 1, wherein at least a first one or more of the plurality of flexible datacenters are co-located with a first BTM power source and wherein at least a second one or more of the plurality of flexible datacenters are collocated with a second BTM power source.

9. The distributed power control system of claim 8, wherein the set of instructions further causes the remote master control system to transfer a load from the first one or more of the plurality of flexible datacenters to the second one or more of the plurality of flexible datacenters.

10. The distributed power control system of claim 1, wherein the detected change relates to a reduced power generation condition of the power generation system.

11. The distributed power control system of claim 10, wherein the reduced power generation condition is associated with a current or expected reduction in available BTM power below a predetermined availability level.

12. A method performed by a remote master control system configured to instruct a plurality of flexible datacenters that affect an amount of BTM power consumed by the plurality of flexible datacenters, wherein each flexible datacenter comprises (i) a plurality of computing systems powered by a behind-the-meter (BTM) power input system, (ii) the BTM power input system configured to receive power from a power generation station prior to the power undergoing step-up transformation for transmission to a grid and deliver the power to the plurality of computing systems, and (iii) a datacenter control system configured to control the plurality of computing systems and the BTM power input system, the method comprising:

detecting a change in a condition affecting an availability of BTM power for powering the plurality of flexible datacenters;

determining, based on the change in the condition, an operational directive to modify power consumption by the plurality of flexible datacenters; and transmitting the operational directive to the datacenter control system to cause the datacenter control system to modulate the amount of power consumed by the plurality of flexible datacenters based on the detected change in the condition.

13. The method of claim 12, wherein the determination of the operational directive is further based on a status of the power generation station.

14. The method of claim 12, wherein the determination of the operational directive is further based on a workload distributed to a first flexible datacenter of the plurality of flexible datacenters.

15. The method of claim 14, wherein the determination of the operational directive is further based on an expected computational demand for the workload.

16. The method of claim 15, further comprising, shifting the workload from the first flexible datacenter to a second flexible datacenter of the plurality of datacenters.

17. The method of claim 12, further comprising, transmitting a specification of a sufficient amount of BTM power to be consumed by the plurality of flexible datacenters.

18. The method of claim 12, wherein the transmission of the operational directive causes the datacenter control system to enable and disable delivery of the BTM power to the plurality of flexible datacenters.

19. The method of claim 12, wherein the remote master control system at least partially controls the power generation station.

20. The method of claim 12, wherein the detected change relates to unutilized power at the power generation station.

* * * * *